United States Patent
Enning et al.

(12) 
(10) Patent No.: US 11,360,018 B2
(45) Date of Patent: Jun. 14, 2022

(54) CORROSION TESTING APPARATUSES AND ASSOCIATED METHODS

(71) Applicant: ExxonMobil Upstream Research Company, Spring, TX (US)

(72) Inventors: Dennis R. Enning, Spring, TX (US); Ramsey J. Smith, Houston, TX (US); Jeffrey D Spitzenberger, Spring, TX (US); Alexander J. Dulin, Hopewell, NJ (US); Oleg Y. Melnichenko, Milford, NJ (US); James K. Backman, Madison, NJ (US); William Farrell, Califon, NJ (US); Kurt R. Grice, Piscataway, NJ (US); Michael Scudiero, Houston, TX (US)

(73) Assignee: ExxonMobil Upstream Research Company, Spring, TX (US)

(*) Notice: Subject to any disclaimer, the term of this patent is extended or adjusted under 35 U.S.C. 154(b) by 473 days.

(21) Appl. No.: 16/679,418

(22) Filed: Nov. 11, 2019

(65) Prior Publication Data

US 2020/0173907 A1 Jun. 4, 2020

Related U.S. Application Data

(60) Provisional application No. 62/773,655, filed on Nov. 30, 2018.

(51) Int. Cl.
*G01N 17/02* (2006.01)
*G01N 17/00* (2006.01)
*G01N 25/44* (2006.01)

(52) U.S. Cl.
CPC ......... *G01N 17/006* (2013.01); *G01N 17/002* (2013.01); *G01N 17/02* (2013.01); *G01N 25/44* (2013.01)

(58) Field of Classification Search
CPC .................................................. G01N 17/006
(Continued)

(56) References Cited

U.S. PATENT DOCUMENTS

| | | | |
|---|---|---|---|
| 5,246,560 | A | 9/1993 | Nekoksa et al. |
| 6,405,582 | B1 | 6/2002 | Boettcher |

(Continued)

FOREIGN PATENT DOCUMENTS

| | | |
|---|---|---|
| EP | 0795028 A1 | 9/1997 |
| WO | 2005/062020 A1 | 7/2005 |
| WO | 2009/125354 A2 | 10/2009 |

OTHER PUBLICATIONS

Fors et al. "Corrosion of high burn-up structured UO2 fuel in presence of dissolved H2." Journal of nuclear materials 394.1 (2009): p .1-8. (Year: 2009).*

(Continued)

*Primary Examiner* — Walter L Lindsay, Jr.
*Assistant Examiner* — Philipmarcus T Fadul
(74) *Attorney, Agent, or Firm* — Leandro Arechederra, III

(57) ABSTRACT

No reliable test presently exists for predicting the amount or type of corrosion a metal surface may experience during field use, particularly when the corrosion can be a result of both acid-induced corrosion and microorganism-induced corrosion mechanisms. Apparatuses affording more field-like testing conditions may comprise: a one-pass fluid train comprising a reservoir configured to maintain a fluid at a first temperature state under anoxic conditions; a pre-conditioning chamber in fluid communication with the reservoir and configured to receive a defined volume of the fluid; an autoclave chamber having an impeller in fluid communication with the pre-conditioning chamber that is configured to receive the defined volume of the fluid from the pre-conditioning chamber; and one or more sampling receptacles in fluid communication with the autoclave chamber that are configured to receive the defined volume of the fluid while maintaining anoxic conditions. The pre-conditioning chamber and the autoclave chamber are configured to maintain anoxic conditions at a second temperature state different than the first temperature state.

30 Claims, 5 Drawing Sheets

(58) Field of Classification Search
USPC .......................................................... 73/865.6
See application file for complete search history.

(56) References Cited

U.S. PATENT DOCUMENTS

| | | |
|---|---|---|
| 6,856,937 B2 | 2/2005 | Herbert-Guillou et al. |
| 6,960,288 B2 | 11/2005 | Marcheal et al. |
| 7,955,818 B2 | 6/2011 | Bernardi et al. |
| 9,546,395 B2 | 1/2017 | Jasko, III et al. |
| 10,005,999 B2 | 6/2018 | Larimer et al. |
| 2014/0048424 A1 | 2/2014 | Gu |
| 2017/0261421 A1 | 9/2017 | Linhardt |
| 2018/0051309 A1 | 2/2018 | Pilloni et al. |
| 2021/0079307 A1* | 3/2021 | Zhu ........................ C10G 75/02 |

OTHER PUBLICATIONS

Bernhardt et al. "High-pressure equipment for growing methanogenic microorganisms on gaseous substrates at high temperature." Applied and environmental microbiology 53.8 (1987): p. 1876-1879. (Year: 1987).*

* cited by examiner

CORROSION TESTING APPARATUSES AND ASSOCIATED METHODS

CROSS REFERENCE TO RELATED APPLICATIONS

This application claims the priority benefit of U.S. Provisional Patent Application No. 62/773,655 filed Nov. 30, 2018, entitled CORROSION TESTING APPARATUSES AND ASSOCIATED METHOD.

FIELD

The present disclosure relates to corrosion testing and testing apparatuses associated therewith.

BACKGROUND

Metal corrosion may occur under various types of operational conditions under field conditions, such during acid exposure (including acids formed following exposure of a fluid to one or more acid-forming gases, such as carbon dioxide and/or hydrogen sulfide) and/or under the influence of certain microorganisms, such as sulfate-reducing bacteria (e.g., *Desulfovibrio* sp. and *Desulfobulbus* sp.) or methanogenic archaea (e.g., *Methanococcus* sp. and *Methanocalculus* sp.). Due to particular operational conditions that are frequently encountered in oilfield environments, one or both types of corrosion are commonly seen in oilfield pressure vessels, pipelines, and other metal infrastructure. Other types of process environments may be similarly be susceptible to varying degrees of corrosion.

At present, there is no reliable way to determine the extent to which metal infrastructure, such as a pipeline, tool, or reactor, for example, will undergo corrosion under actual operational conditions in the field. Laboratory corrosion tests are currently performed in order to determine the possible extent of corrosion that may occur under a given set of conditions. In addition or alternately, modeling may be performed to approximate field conditions. However, conditions achievable with current laboratory tests may inadequately simulate those occurring under operational conditions in the field, thereby leading to an inaccurate determination of corrosion rates. Namely, current laboratory testing protocols do not adequately account for the influence of microorganisms on acid-induced corrosion. Moreover, current laboratory tests do not allow one to determine the relative extents to which microorganism-induced corrosion and acid-induced corrosion drive or contribute to a particular corrosive event. Corrosion modeling, on the other hand, currently fails to incorporate the complexity of microbiological systems in impacting corrosion processes.

Although laboratory testing methods for measuring corrosion rates have heretofore attempted to simulate various operational conditions in the field, it has proven difficult to provide testing conditions that are fully reflective of those that may occur under field conditions. Namely, it is difficult to provide testing conditions that are simultaneously reflective of the particular microbiological influences, acid-forming gas pressures, and/or shear conditions that may be present in the field. Since corrosion may occur through competing mechanisms that may be influenced by one or more of these factors and others, inadequate simulation of various field operational conditions during laboratory corrosion testing may lead to an inaccurate determination of corrosion rates. Likewise, laboratory corrosion testing may similarly lead to an inaccurate conclusion regarding the underlying corrosion mechanism taking place in the field. These factors can all lead to misguided corrosion management efforts.

Laboratory analyses of fluid samples obtained from a work site in the field are similarly problematic for correlating test data to an observed corrosion rate. At the very least, adequate sampling frequency may be challenging. Adequate preservation of field samples until they reach a testing laboratory can also be problematic. Although averaged corrosion data may be obtained for field samples gathered at a desired collection rate (e.g., yearly during in-line inspection), there is no way of knowing for certain whether corrosion was actually occurring at the time the field samples were collected. While the average corrosion rate of a metal surface may be known, it is not currently feasible to determine the extent to which the corrosion was caused by microorganisms as opposed to acid gas corrosion, especially at different points in time.

SUMMARY

In various embodiments, the present disclosure provides testing apparatuses for assaying corrosion, particularly microbiological and chemical contributors to corrosion. The testing apparatuses at least comprise a first one-pass fluid train comprising: a first reservoir configured to maintain a first fluid at a first temperature state under anoxic conditions; a first pre-conditioning chamber in fluid communication with the first reservoir and configured to receive a first fluid stream comprising a defined volume of the first fluid from the first reservoir; a first autoclave chamber in fluid communication with the first pre-conditioning chamber and configured to receive the defined volume of the first fluid from the first pre-conditioning chamber, the first autoclave chamber having an impeller located therein; and one or more sampling receptacles in fluid communication with the first autoclave chamber and configured to receive the defined volume of the first fluid from the first autoclave chamber and to maintain the defined volume of the first fluid under anoxic conditions. The first pre-conditioning chamber and the first autoclave chamber are configured to be maintained under anoxic conditions at a second temperature state different than the first temperature state, or the first pre-conditioning chamber and the first autoclave chamber are configured to be maintained under anoxic conditions at the second temperature state and a third temperature state, respectively, which are each different than the first temperature state.

In other various embodiments, the present disclosure provides methods for assaying corrosion, particularly microbiological and chemical contributors to corrosion. The methods at least comprise: providing a first fluid in a first reservoir maintained at a first temperature state under anoxic conditions; transferring a first fluid stream comprising a defined volume of the first fluid from the first reservoir to a first pre-conditioning chamber in fluid communication with the first reservoir; maintaining the defined volume of the first fluid in the first pre-conditioning chamber under anoxic conditions for a first predetermined conditioning time at a second temperature state different than the first temperature state, the defined volume of the first fluid being pressurized with one or more anoxic gases during the first predetermined conditioning time; transferring the defined volume of the first fluid from the first pre-conditioning chamber to a first autoclave chamber in fluid communication with the first pre-conditioning chamber, the first autoclave chamber containing one or more metal test coupons therein; maintaining the defined volume of the first fluid in the first autoclave chamber at about the second temperature state or a third temperature state under anoxic conditions for a first predetermined testing time, the defined volume of the first fluid being pressurized with one or more anoxic gases and agitated with an impeller in the first autoclave chamber during the first predetermined testing time; and transferring the defined volume of the first fluid from the first autoclave chamber to one or more sampling receptacles in fluid communication with the first autoclave chamber, the one or more sampling receptacles maintaining the defined volume of the first fluid under anoxic conditions. The defined volume of the first fluid may include dissolved acid-forming gases, acids, or similar contributors to corrosion.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one of ordinary skill in the art and having the benefit of this disclosure.

DETAILED DESCRIPTION

The present disclosure generally relates to corrosion and, more specifically, to apparatuses and testing methods that may effectively simulate corrosive conditions encountered during operations in a field environment, particularly an oilfield environment.

As discussed above, metal corrosion may occur due to a variety of operational conditions that may be encountered in the field, with the corrosion mechanism primarily being linked to acid exposure, including dissolved acid-forming gases, and/or the presence of one or more types of microorganisms. However, it is difficult at present to evaluate under laboratory testing conditions how a particular type of metal infrastructure will perform in its operational environment. In addition, it is difficult to determine the relative extent to which a given corrosive event occurs due to microorganism-induced corrosion versus acid-induced corrosion. Conditions leading to these discrepancies are discussed further below. In addition, it is currently believed to be impossible to evaluate the extent and/or type of corrosion taking place at a given point in time based upon laboratory analyses of fluids obtained from a work site.

Figure 1:
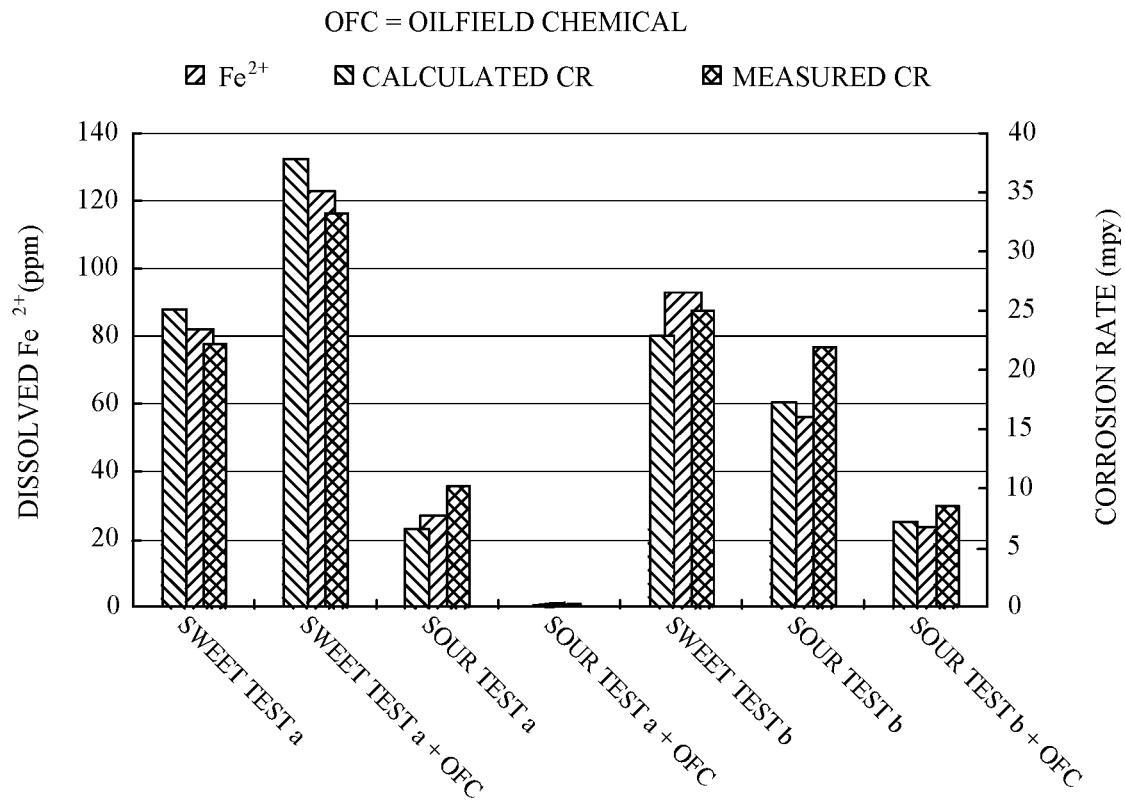
FIG. 1 shows a graph of calculated and measured corrosion rates and measured dissolved iron ($Fe^{2+}$) concentrations obtained during typical laboratory corrosion testing experiments.

As a non-limiting example of the difficulties associated with evaluating laboratory corrosion testing data, FIG. 1 shows a graph of calculated and measured corrosion rates ("CR") and measured dissolved iron ($Fe^{2+}$) concentrations obtained during typical laboratory corrosion testing experiments. The measured dissolved iron concentrations may be used to determine a corresponding calculated corrosion rate. Measured corrosion rates are usually determined by conducting post-analysis weight loss measurements of the samples (metal test coupons), possibly including more detailed analyses (such as white light interferometry) to determine where and/or how localized corrosion has occurred. Weight loss measurements and more detailed surface analyses are not easily performed during a corrosion test, however. While calculated corrosion rates based upon dissolved iron concentrations (or another dissolved metal) do not always track exactly with the measured corrosion rates, the dissolved iron concentration is at least a reasonable indicator of the true corrosion rate. Metal analyses of fluids in the field may also underestimate the true corrosion rate, since there may be other complicating factors that lead to a decreased metal ion concentration (e.g., due to precipitation). Moreover, such corrosion testing experiments fail to provide insight into the mechanism through which the corrosion occurs.

Under operational conditions in the field, a fluid may be flowing (e.g., through a pipeline) and providing a shear force to a metal surface in contact with the fluid. The shear force may impact microorganism-induced corrosion and acid-induced corrosion to variable extents. For both types of corrosion, a fluid providing a shear force upon a metal surface may promote a significantly greater corrosion rate due to mass transport considerations. Although shear forces may be approximated in conventional laboratory testing methods (e.g., using pressurized bottle tests with mechanical agitation or stirring), such testing may be inconvenient to perform and may not be reflective of conditions that are actually present in the field. Namely, pressurized bottle tests are typically conducted with a static quantity of fluid over an extended period of time, during which the fluid may undergo changes that are dissimilar to those occurring in the field. For example, in a pressurized bottle test, a given microorganism load may be in contact with a metal surface for a much longer period of time than would occur with a flowing fluid in the field. Biofilm formation and growth of microorganisms during such static tests may lead to significant deviation from the corrosive conditions present in the field. Other laboratory conditions may likewise deviate significantly from those that are present under operational conditions in the field (e.g., availability of microbial nutrients), thereby leading to differences between the predicted and actual rates of corrosion. Thus, it can be appreciated that just because a laboratory test shows conditions that may be prone to promoting corrosion (e.g., a given microorganism load or acidity), it is not possible to reliably conclude that corrosion or a given type of corrosion has or will take place under operational conditions in the field.

The present disclosure alleviates the foregoing difficulties and provides even further advantages, as discussed hereinafter. In particular, the present disclosure provides testing apparatuses comprising one or more one-pass fluid trains that may allow laboratory corrosion testing to better simulate the conditions occurring in the field during operational use of particular types of metal infrastructure. Each one-pass fluid train may maintain a fluid therein under anoxic conditions, thereby providing an accurate simulation of conditions similar to those found in oilfield fluids, which rarely contain dissolved oxygen. The anoxic conditions may further provide an acid-forming gas, such as carbon dioxide or hydrogen sulfide, that may promote acid-induced corrosion. Each one-pass fluid train comprises a reservoir of a fluid, a pre-conditioning chamber that may hold a defined volume of the fluid immediately prior to corrosion testing, an impeller-containing autoclave chamber for housing one or more metal test coupons for corrosion testing, and one or more sampling receptacles that receive the defined volume of fluid following the completion of corrosion testing. Each one-pass fluid train is configured to maintain anoxic conditions throughout. The functions and advantages of each component of the one-pass fluid trains as they relate to corrosion testing and toward providing a more accurate representation of potentially corrosive conditions in the field are discussed in brief hereinafter before providing additional details further below.

The reservoir maintains a quantity of fluid under anoxic conditions at a first temperature state. The first temperature state maintained within the reservoir may differ from the temperature state in other portions of the testing apparatus. Namely, the reservoir may actively cool the quantity of fluid to suppress unwanted bacterial growth prior to the commencement of corrosion testing in a downstream portion of the one-pass fluid train. Active cooling of the quantity of fluid may also lessen the likelihood of chemical degradation prior to the commencement of corrosion testing (e.g., due to degradation of organic components within the fluid). The reservoir may hold an actual fluid obtained from a work site (e.g., from an oilfield), or the fluid may be a synthetic version of an actual fluid.

The reservoir supplies a defined volume of the fluid (i.e., an aliquot) to a pre-conditioning chamber downstream of the reservoir. The pre-conditioning chamber may be configured to operate at a second temperature state that is different than the first temperature state in order to bring the defined volume of the fluid to the corrosive conditions to be employed subsequently during corrosion testing. In addition to raising the temperature of the fluid to the second temperature state, pressurization of the fluid with an anoxic gas, particularly one or more acid-forming gases, may take place through sparging in the pre-conditioning chamber. Sparging may take place, for example, until a desired pH has been reached in the fluid. As such, the fluid that is provided to one or more metal test coupons during the corrosion test may better simulate conditions occurring in the field.

Once the fluid has been suitably pre-conditioned, the pre-conditioning chamber supplies the defined volume of the fluid to an autoclave chamber containing an impeller. The autoclave chamber may maintain the fluid under a pressurized state for an extended period of time while exposing the fluid to one or more metal test coupons disposed therein. Rotation of the impeller during the test period provides fluid agitation and implements a shear force upon one or more surfaces (e.g., at least a portion of the metal test coupons) in the autoclave chamber. The rotation rate of the impeller may be regulated to adjust the amount of shear forces imparted within the autoclave chamber in order to simulate shear forces experienced by metal infrastructure during actual field conditions (e.g., in an oil well or pipeline). In addition, further provisions may be taken to limit exposure of some of the metal test coupons in the autoclave chamber to the shear forces. Thus, the influence of different shear force conditions upon the rate of corrosion may be analyzed in the same autoclave chamber.

Finally, once corrosion testing has taken place for a predetermined length of time, the defined volume of fluid is supplied from the autoclave chamber to one or more sampling vials so that further analyses may be conducted. Analyses of the fluid contained within the one or more sampling vials may include, for example, metal analyses, analyses for organic or inorganic chemicals, biological analyses, the like, and any combination thereof. The fluid may continue to be stored under anoxic conditions while in the one or more sampling vials to limit degradation thereof.

Once the defined volume of fluid has been drained from the autoclave chamber, a fresh portion of fluid (second or subsequent defined volume of the fluid) may be introduced to the autoclave chamber from the pre-conditioning chamber, thereby allowing the corrosion testing process to continue. A suitable frequency for draining and refilling the autoclave chamber may be dictated by various factors, such as the composition of the fluid undergoing testing. For example, factors that may dictate a suitable frequency for draining and refilling the autoclave chamber include the amount of dissolved acid-forming gases (e.g., carbon dioxide or hydrogen sulfide), the microorganism load, and the presence or absence of various chemicals within the fluid (e.g., a corrosion inhibitor). The corrosion testing processes disclosed herein are episodic in nature (i.e., batchwise exposure of the metal test coupons to a potentially corrosive fluid for a predetermined testing time, followed by exchange for a fresh portion of fluid). Although exposure of the metal test coupons to a given quantity of the fluid is longer in the methods of the present disclosure than typically occurs with a flowing fluid in the field, the exposure or contact time may be considerably shorter than in the extended, static bottle tests that are often performed in conjunction with laboratory corrosion testing methods. Because fluid exchange occurs more frequently in the methods of the present disclosure than in static bottle tests, there is less opportunity for the fluid to undergo unwanted changes (e.g., increasing bacterial load) during the test period. Thus, the testing methods of the present disclosure may afford a more accurate representation of working conditions and corrosion processes occurring in the field. That is, the testing methods of the present disclosure provide a reasonable approximation of dynamic fluid exposure conditions in the field.

As mentioned above, the fluid samples obtained downstream from the autoclave chamber in the one or more sampling receptacles may be analyzed for symptoms of corrosion. For example, an increasing metals concentration in the fluid samples over time may be indicative of progressively increasing corrosion within the metal test coupons in the autoclave chamber. Similarly, leaching of a substantially constant amount of metals in each fluid sample may be indicative of a steady state corrosion process that is ongoing with each fluid exchange over time. Thus, testing apparatuses and methods of the present disclosure employing at least one of the one-pass fluid trains may be sufficient to determine that corrosion is indeed occurring.

Advantageously, the testing apparatuses and methods of the present disclosure may employ at least two one-pass fluid trains that are distinct from one another (i.e., are not in fluid communication with one another) but are substantially identical in structure. Configurations with two one-pass fluid trains and three one-pass fluid trains are possible in particular embodiments. Configurations with two one-pass fluid trains may comprise a first one-pass fluid train and a second one-pass fluid train that are substantially identical to one another in structure and are operated under the same conditions, with the exception that the fluid contained in the second one-pass fluid train is sterilized and/or includes one or more additives intended to suppress the growth of microorganisms. Analyses of the fluid samples obtained from each fluid train may allow a determination of whether the corrosion taking place in the first one-pass fluid train is acid-induced, microorganism-induced, or a combination thereof, as explained hereinafter.

Total corrosion in a fluid sample may be expressed by Equation 1, $$C_T = C_A + C_M \quad \text{(Equation 1)}$$

wherein $C_A$ is the acid-induced corrosion or a measured parameter associated with acid-induced corrosion, $C_M$ is the microorganism-induced corrosion or a measured parameter associated with microorganism-induced corrosion, and $C_T$ is the total corrosion or a measured parameter associated with the total of both types of corrosion. The corrosion taking place in the second one-pass fluid train has a $C_M$ value of substantially zero, since the fluid therein is sterilized. Therefore, the total corrosion in the second one-pass fluid train is equivalent to the acid-induced corrosion $C_A$. Provided that the first one-pass fluid train and the second one-pass fluid train are operated under similar conditions, the acid-induced corrosion occurring in the second one-pass fluid train is equivalent to that occurring in the first one-pass fluid train. Thus, by subtracting the acid-induced corrosion analyzed for the second one-pass fluid train from the total corrosion analyzed for the first one-pass fluid train, the microorganism-induced corrosion for the first one-pass fluid train may be determined. Therefore, the relative amounts of each type of corrosion under various testing conditions may be determined according to the methods described herein.

Configurations comprising at least three one-pass fluid trains that are distinct from one another may be advantageous in various respects as well. The first two one-pass fluid trains may be used to determine relative extents to which acid-induced corrosion and microorganism-induced corrosion take place, as discussed above. The third one-pass fluid train may be used to determine the effectiveness of one or more additives for lessening the effects of corrosion. Thus, by subtracting the total corrosion analyzed for the third one-pass fluid train from that analyzed for the first one-pass fluid train and/or the second one-pass fluid train, the effectiveness of the one or more additives against acid-induced corrosion and/or microorganism-induced corrosion may be determined. Alternately, the effectiveness of the one or more additives against total corrosion may be determined, without determining the separate effectiveness against acid-induced corrosion and microorganism-induced corrosion (i.e., without making a comparison against the fluid in the second one-pass fluid train).

As still another advantage, the testing apparatuses and methods described herein allow inline modification of a fluid stream to take place during transit between a given reservoir and the corresponding pre-conditioning chamber. Namely, the testing apparatuses and methods described herein include stores of additional chemicals (e.g., oilfield chemicals) that may be introduced to the fluid prior to or concurrently with its introduction into the pre-conditioning chamber. Thus, the testing apparatuses and methods of the present disclosure allow a common fluid source to be stored or preserved (e.g., with active cooling to suppress bacterial growth and chemical degradation) rather than having to separately preserve a multitude of formulated fluids over extended storage times. Advantageously, the fluid stream may be formulated differently, if desired, for each portion of the fluid stream transferred to the pre-conditioning chamber.

As a still further advantage of the testing apparatuses and methods described herein, corrosion testing may be fully or partially automated at the discretion of a user. Automation may be particularly beneficial when the fluid exchange frequency is known before starting a corrosion testing experiment. Of course, manual operation of the testing apparatuses and methods also lies within the scope of the present disclosure.

Before describing the testing apparatuses and methods of the present disclosure in further detail, a listing of terms follows to aid in better understanding the present disclosure.

All numerical values within the detailed description and the claims herein are modified by "about" or "approximately" with respect to the indicated value, and take into account experimental error and variations that would be expected by a person having ordinary skill in the art. Unless otherwise indicated, room temperature is about 25° C.

As used in the present disclosure and claims, the singular forms "a," "an," and "the" include plural forms unless the context clearly dictates otherwise.

The term "and/or" as used in a phrase such as "A and/or B" herein is intended to include "A and B," "A or B," "A", and "B."

For the purposes of the present disclosure, the new numbering scheme for groups of the Periodic Table is used. In said numbering scheme, the groups (columns) are numbered sequentially from left to right from 1 through 18, excluding the f-block elements (lanthanides and actinides).

The term "corrosion" refers to deterioration of a metal by localized pitting, general (non-localized) dissolution, and/or erosion upon exposure to a reactive or corrosive environment. Localized pitting and general dissolution may occur primarily due to interaction with a reactive or corrosive environment, whereas erosion may further take place in combination with mechanical impacts to the metal surface. Corrosion may also be defined in terms of an electrochemical interaction between a metal and a fluid that results in oxidation of the metal, accompanied by possible dissolution thereof.

The term "acid-induced corrosion" refers to corrosion taking place upon a metal surface due to the presence of an acid in the fluid, particularly an acid formed in the presence of an acid-forming gas such as carbon dioxide or hydrogen sulfide.

The term "microorganism-induced corrosion" refers to corrosion taking place upon a metal surface due to the presence of a microorganism in the fluid, particularly an anaerobic microorganism. The terms "microbiologically induced corrosion," "microbially induced corrosion," "microbial corrosion," and similar terms may be used synonymously with the term "microorganism-induced corrosion."

The term "corrosion resistance" refers to a material's relative susceptibility toward corrosion.

The term "anoxic conditions" refers to the state of being in the substantial absence of oxygen.

The term "actively cooled" and grammatical variants thereof refer to lowering the temperature of a fluid using any suitable thermal management technique, such as refrigeration.

Testing apparatuses of the present disclosure may comprise at least one of the one-pass fluid trains described herein. Particular configurations of the testing apparatuses may comprise a single one-pass fluid train, or two one-pass fluid trains, or three one-pass fluid trains, as described further herein.

Accordingly, testing apparatuses of the present disclosure may comprise at least first one-pass fluid train comprising: a first reservoir configured to maintain a first fluid at a first temperature state under anoxic conditions; a first pre-conditioning chamber in fluid communication with the first reservoir and configured to receive a first fluid stream comprising a defined volume of the first fluid from the first reservoir; a first autoclave chamber in fluid communication with the first pre-conditioning chamber and configured to receive the defined volume of the first fluid from the first pre-conditioning chamber, the first autoclave chamber having an impeller located therein; and one or more sampling receptacles in fluid communication with the first autoclave chamber and configured to receive the defined volume of the first fluid from the first autoclave chamber and to maintain the defined volume of the first fluid under anoxic conditions. The first pre-conditioning chamber and the first autoclave chamber are configured to be maintained under anoxic conditions at a second temperature state different than the first temperature state, or the first pre-conditioning chamber and the first autoclave chamber are configured to be maintained under anoxic conditions at the second temperature state and a third temperature state, respectively, which are each different than the first temperature state.

Configurations of the testing apparatuses featuring two or more of the one-pass fluid trains may further comprise at least one second one-pass fluid train separate from the first one-pass fluid train. The term "separate" means that there is no fluid communication between the fluid trains. The at least one second one-pass fluid train may comprise one or more one-pass fluid trains that are substantially similar in structure to the first one-pass fluid train but include a different fluid therein. More specifically, the at least one second one-pass fluid train may comprise: a second reservoir configured to maintain a second fluid at about the first temperature state under anoxic conditions; a second pre-conditioning chamber in fluid communication with the second reservoir and configured to receive a second fluid stream comprising a defined volume of the second fluid from the second reservoir; a second autoclave chamber in fluid communication with the second pre-conditioning chamber and configured to receive the defined volume of the second fluid from the second pre-conditioning chamber, the second autoclave chamber having an impeller located therein; and one or more sampling receptacles in fluid communication with the second autoclave chamber and configured to receive the defined volume of the second fluid from the second autoclave chamber and to maintain the defined volume of the second fluid under anoxic conditions. The second pre-conditioning chamber and the second autoclave chamber are configured to be maintained under anoxic conditions at about the second temperature state, which is different than the first temperature state, or the second pre-conditioning chamber and the second autoclave chamber are configured to be maintained under anoxic conditions at about the second temperature state and a third temperature state, respectively, which are each different than the first temperature state.

Testing apparatuses comprising two one-pass fluid trains in total may feature a single one-pass fluid train as the at least one second one-pass fluid train, which is separate from the first one-pass fluid train. Similarly, testing apparatuses comprising three one-pass fluid trains in total may feature two one-pass fluid trains as the at least one second one-pass fluid train, which are separate from one another and from the first one-pass fluid train. The two one-pass fluid trains contain a second fluid and a third fluid, respectively. More specific testing apparatus configurations featuring three one-pass fluid trains in total may comprise a third one-pass fluid train separate from the first one-pass fluid train and the second one-pass fluid train, where the third one-pass fluid train comprises: a third reservoir configured to maintain a third fluid at about the first temperature state under anoxic conditions; a third pre-conditioning chamber in fluid communication with the third reservoir and configured to receive a third fluid stream comprising a defined volume of the third fluid from the third reservoir; a third autoclave chamber in fluid communication with the third pre-conditioning chamber and configured to receive the defined volume of the third fluid from the third pre-conditioning chamber, the third autoclave chamber having an impeller located therein; and one or more sampling receptacles in fluid communication with the third autoclave chamber and configured to receive the defined volume of the third fluid from the third autoclave chamber and to maintain the defined volume of the third fluid under anoxic conditions. The third pre-conditioning chamber and the third autoclave chamber are configured to be maintained under anoxic conditions at about the second temperature state, which is different than the first temperature state, or the third pre-conditioning chamber and the third autoclave chamber are configured to be maintained under anoxic conditions at about the second temperature state and a third temperature state, respectively, which are each different than the first temperature state.

More typically, each pre-conditioning chamber and each autoclave chamber are configured to be operated at the second temperature state in the testing apparatuses described herein. Testing apparatus configurations in which the pre-conditioning chambers and the autoclave chambers are configured to operate at different temperature states (i.e., a second temperature state and a third temperature state) are also possible, however.

Figure 2:
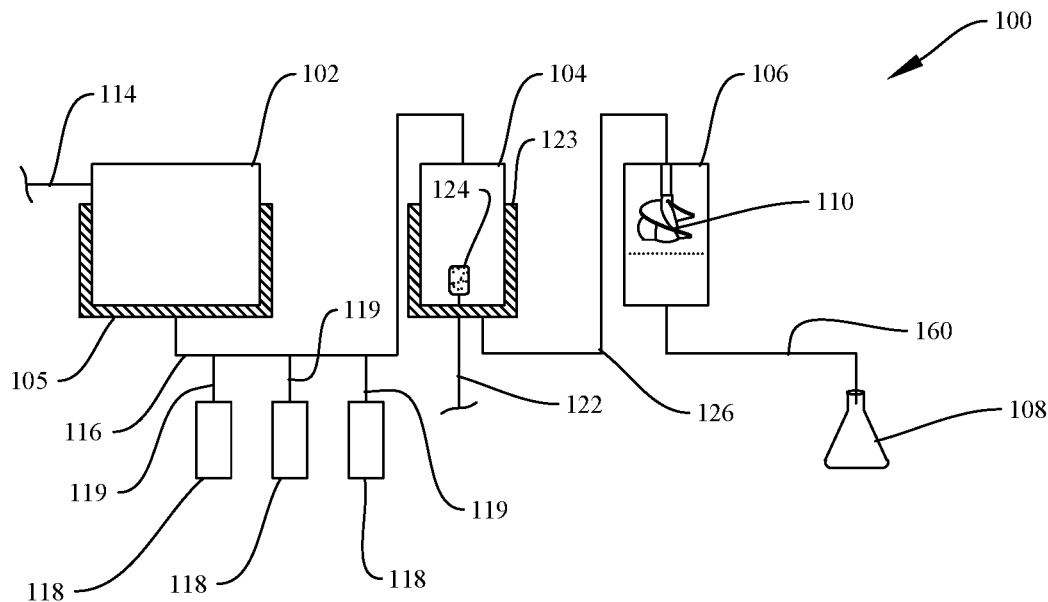
FIG. 2 shows a block diagram of a single one-pass fluid train that may be in the testing apparatuses disclosed herein.

Turning to the drawings, FIG. 2 shows a block diagram of a single one-pass fluid train that may be in the testing apparatuses disclosed herein. As discussed above, the testing apparatuses disclosed herein may feature one or more of the one-pass fluid trains, with one, two or three of the one-pass fluid trains being present in particular testing apparatus configurations. Testing apparatus configurations featuring multiple one-pass fluid trains may be characterized by the one-pass fluid trains each being substantially similar in structure to one another. Multiple one-pass fluid trains may contain different fluids, as referenced above and discussed in further detail below. Thus, the single one-pass fluid train depicted in FIG. 2 should be considered illustrative of those that may be present in testing apparatus configurations featuring multiple occurrences of the one-pass fluid trains. With respect to the one-pass fluid trains, it is to be appreciated that various components are not necessarily depicted in the drawings or described herein in the interest of brevity. Various components having well-understood functions that may be present in the one-pass fluid trains include, for example, pumps, valves, baffles, and the like.

With more specific reference to FIG. 2, one-pass fluid train 100 includes reservoir 102, pre-conditioning chamber 104, autoclave chamber 106, and sampling receptacle 108, all in fluid communication with one another. Reservoir 102, pre-conditioning chamber 104, autoclave chamber 106, and sampling receptacle 108 are all configured to maintain a fluid therein under anoxic conditions at each location. Further details of each component within one-pass fluid train 100, including structural details of autoclave chamber 106 and the disposition of metal test coupons therein, are provided hereinbelow.

Reservoir 102 is configured to maintain (store) a quantity of fluid under anoxic conditions and specified thermal conditions while corrosion testing is being performed. Fluids that may be maintained in reservoir 102 are not particularly limited and include any fluid that may be in contact with a metal surface and potentially lead to corrosion thereof. The quantity of the fluid and the corresponding volume of reservoir 102 may be chosen to allow a sufficient number of fluid exchanges to be performed when conducting a corrosion test according to the disclosure herein, as described further hereinbelow. Illustrative fluids that may be maintained in reservoir 102 include, for example, salt water, seawater (natural or synthetic seawater), brine, fresh water, acidified water, produced water, mixtures of water and water-miscible organic compounds, aqueous oilfield fluids, and the like. Anoxic conditions may be maintained in reservoir 102 using an inert gas, such as nitrogen, argon, helium, carbon dioxide, or any mixture thereof. Inert gas may be supplied as a gas blanket to reservoir 102 using inert gas line 114.

Reservoir 102 may be cooled using cooling device 105, such as refrigeration or another type of active cooling. It is to be appreciated that any suitable configuration for cooling device 105 may be present that is capable of maintaining the fluid in reservoir 102 at a desired temperature. In general, the temperature of the fluid in reservoir 102 may range from below room temperature down to the freezing point of the fluid. In particular testing apparatus and testing method configurations, the fluid in reservoir 102 may be maintained at a temperature ranging from about 10° C. to about −5° C., or from about 15° C. to about 0° C. A suitable temperature range at which the fluid in reservoir 102 is maintained may be further dictated by the freezing point of the fluid and the temperature below which substantial growth of microorganisms does not occur. As indicated above, maintaining anoxic conditions and actively cooling reservoir 102 allows storage of the fluid therein in a condition such that it does not change substantially over the length of time while corrosion testing is being performed.

Reservoir 102 is in fluid communication with pre-conditioning chamber 104 via transfer line 116, thereby allowing a fluid stream comprising a defined volume (portion) of the fluid in reservoir 102 to be transferred to pre-conditioning chamber 104 under anoxic conditions. A pump (not shown in FIG. 2) may facilitate transfer of the fluid stream through transfer line 116. Pressurized inert gas may also be used to remove remaining traces of the fluid stream from transfer line 116 after most of the fluid stream has been transferred using the pump. The defined volume of the fluid transferred to pre-conditioning chamber 104 is subsequently transferred to autoclave chamber 106, as discussed further hereinbelow. The defined volume of the fluid transferred to pre-conditioning chamber 104 and subsequently to autoclave chamber 106 is chosen to be sufficient for investigating corrosion of metal test coupons in autoclave chamber 106 over a desired length of time. For example, the amount of fluid present in the defined volume of fluid may be chosen to fully wet the metal test coupons in autoclave chamber 106.

The fluid stream transferred to pre-conditioning chamber 104 may remain compositionally the same during the transfer, or the fluid stream may undergo compositional modification during the transfer process. Specifically, chemical supplies 118 and supply lines 119 may be configured as one or more inlets configured to introduce one or more chemicals into the fluid stream within transfer line 116 during transit of the fluid stream to pre-conditioning chamber 104. That is, one-pass fluid train 100 is configured such that inline mixing of a formulated fluid may take place inline within transfer line 116 Inline mixing of a formulated fluid may be desirable, particularly given the extended study times over which corrosion testing is typically conducted. Inline mixers (not shown in FIG. 2) may also be present in transfer line 116. Although it is possible to store a formulated fluid in reservoir 102, some formulated fluids may degrade over extended storage times, even under actively cooled conditions. Thus, inline mixing within transfer line 116 may afford a formulated fluid that is more representative of the formulated fluid in its operational environment. Although three chemical supplies 118 and supply lines 119 are depicted in FIG. 2, it is to be appreciated that fewer or greater numbers may be present. Moreover, chemical supplies 118 and supply lines 119 may provide the same chemical or different ones, according to various testing apparatus and method requirements. Chemicals that may be introduced to the fluid stream may include one or more chemicals such as, for example, a corrosion inhibitor, a scale inhibitor, a drag reducing agent, a hydrate inhibitor, an oxygen scavenger, a sulfide scavenger, a de-emulsifier, an emulsifier, a surfactant, an antifoaming agent, a biocide, an acid, a base, or any combination thereof. Suitable examples of these types of chemicals will be familiar to one having ordinary skill in the art and will not be discussed in further detail herein. Each time a formulated fluid is prepared in transfer line 116, the composition may be the same or different. Using different formulated fluids may allow transient changes in field conditions to be studied (e.g., periodic introduction of a biocide, corrosion inhibitor, or other oilfield chemical), as may be applicable for studying some field conditions.

Within pre-conditioning chamber 104, the defined volume of the fluid may be equilibrated over a predetermined length of time to a desired state (e.g., a stable temperature and/or state of acid-forming gas saturation). Both heating and pressurization of the fluid may take place in pre-conditioning chamber 104. Pre-conditioning chamber 104 may be heated using any suitable heating device 123, such as a heating tape, heating mantle, oven, circulating fluid coils, or the like. It is to be appreciated that any heating device configuration capable of heating the defined volume of the fluid in pre-conditioning chamber 104 to a desired temperature may be suitable for use in the testing apparatus configurations and methods disclosed herein.

Typically, the fluid is equilibrated in pre-conditioning chamber 104 to substantially the same temperature conditions that are present downstream in autoclave chamber 106 (i.e., a second temperature state in both locations). Alternately, however, the fluid in pre-conditioning chamber 104 may be brought to an intermediate temperature state differing from that present in autoclave chamber 106 (i.e., a second temperature state in one location and a third temperature state in one location). The intermediate temperature state in pre-conditioning chamber 104 may be greater than or less than that present in autoclave chamber 106. The temperature within autoclave chamber 106, in turn, may be substantially the same temperature as that present in the operational conditions in the field, which one is seeking to mimic during laboratory corrosion testing.

In addition to bringing the defined volume of fluid up to a desired temperature, pre-conditioning chamber 104 may be further configured to saturate the fluid with one or more acid-forming gases, such as carbon dioxide or hydrogen sulfide. The acid-forming gases may further aid in maintaining anoxic conditions within pre-conditioning chamber 104. Namely, gas sparging line 122 may be fluidly connected to sparger 124 within pre-conditioning chamber 104. Sparger 124 is configured to discharge a plurality of gas bubbles into the fluid within pre-conditioning chamber 104, thereby saturating the fluid with an acid-forming gas during the pre-conditioning time. Saturating the fluid with an acid-forming gas at pressure immediately prior to transferring the fluid to autoclave chamber 106 may be desirable to preclude potential acid degradation during extended storage times, for example. Saturation at pressure may also achieve similar concentrations of dissolved acid-forming gases to those encountered in pressurized oilfield infrastructure (e.g., pipelines and pressure vessels).

Once the fluid in pre-conditioning chamber 104 has reached a suitable equilibration condition, the fluid may then progress to autoclave chamber 106 through transfer line 126. This transfer may take place through a pressure gradient existing between pre-conditioning chamber 104 and autoclave chamber 106. Transfer line 126 may be purged with inert gas to maintain the anoxic conditions. Autoclave chamber 106 may continue to maintain the fluid under anoxic conditions, as discussed further herein. Once the fluid has been transferred to autoclave chamber 106, agitation of the fluid may take place with impeller 110. Impeller 110 may be rotated at a rate sufficient to induce a shear condition within the fluid, with the chosen rotation rate being selected to induce a desired amount of shear force upon one or more metal test coupons housed within autoclave chamber 106. Flow channels may be present within the exterior walls of autoclave chamber 106 to allow active heating or cooling of the internal volume to take place in order to maintain a desired temperature. Cooling may be needed, for example, to compensate for heat generated during rotation of impeller 110. Further structural and operational details of autoclave chamber 106, including the disposition of the metal test coupons therein, are provided hereinafter in reference to FIGS. 3A-3D.

Figure 3A:
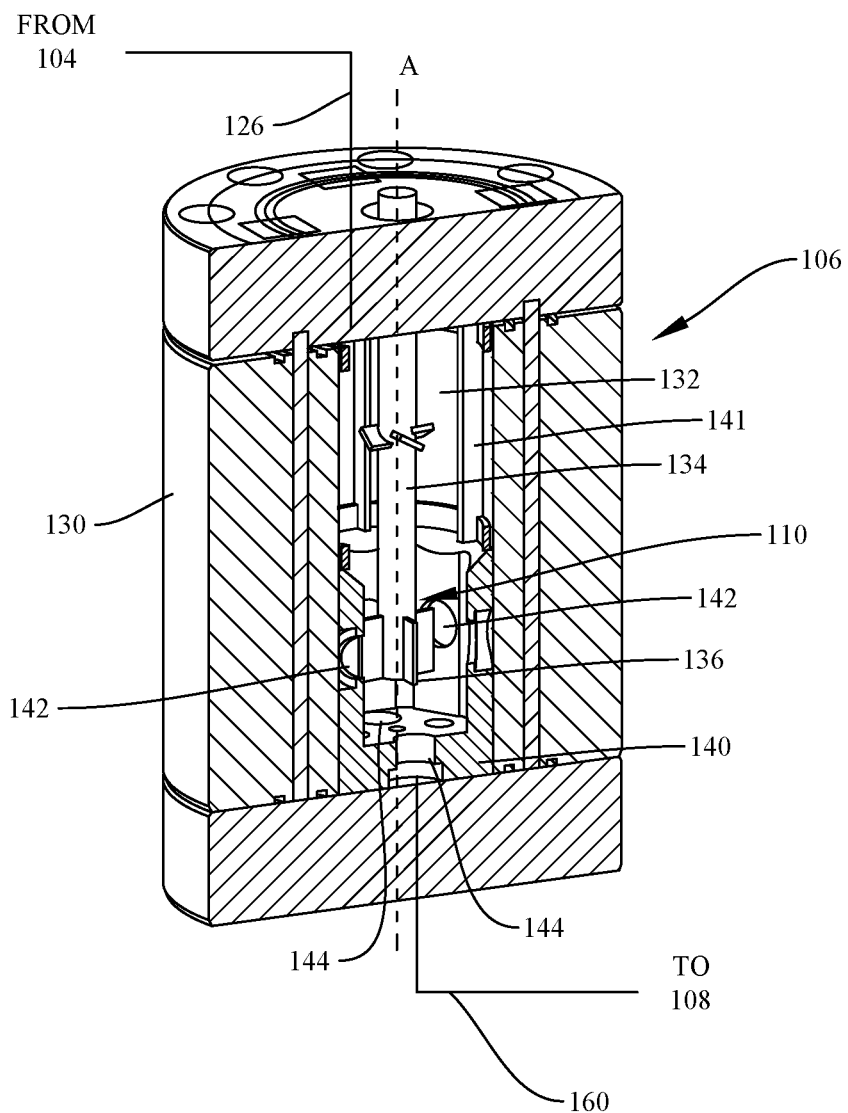
FIG. 3A shows a perspective, cross-sectional view of one configuration of an autoclave chamber that may be used in various aspects of the present disclosure.

FIG. 3A shows a perspective, cross-sectional view of one configuration of autoclave chamber 106 that may be used in various aspects of the present disclosure. As shown, autoclave chamber 106 includes outer body 130 and chamber 132 defined therein. Impeller 110 is arranged within chamber 132 and includes shaft 134 and blades 136. Shaft 134 is operably connected to a motor (not shown in FIG. 3A) for affecting rotation of blades 136. Various configurations for blades 136 may be compatible for use in autoclave chamber 106, and particular configurations may be chosen, for example, based upon the nature of the fluid housed within autoclave chamber 106 and the desired magnitude of the shear condition to be applied thereto. Impeller 110 or blades 136 of impeller 110 may be replaceable with alternative blade configurations in some instances.

Referring still to FIG. 3A, coupon insert 140 is positionable within chamber 132. Baffles 141 are located above coupon insert 140 to stabilize flow and to mitigate eddy formation while rotating impeller 110. Coupon insert 140 is made of a material that is substantially incapable of undergoing corrosion. Illustrative materials that may comprise coupon insert 140 include polymers such as PEEK (polyetheretherketone), for example. Coupon insert 140 contains one or more locations for affixing (holding) metal test coupon(s) within autoclave chamber 106 (metal test coupons not shown in FIG. 3A). As shown, one or more radial coupon positions 142 are disposed about the circumference of coupon insert 140 and are generally adjacent to outer body 130 of autoclave chamber 106. Metal test coupons are thereby flush-mounted with the inner face of coupon insert 140. Although four radial coupon positions 142 are shown in FIG. 3A, it is to be appreciated that more or fewer positions may be present in particular apparatus configurations, such as to accommodate metal test coupons having a particular size, for example. Coupon insert 140 also includes one or more axial coupon positions 144, which are generally disposed within or proximate to the lower face of coupon insert 140. Because they are located in different positions, metal test coupons housed within radial coupon positions 142 and axial coupon positions 144 may experience variable amounts of shear forces, as discussed hereinafter. Axial coupon positions 144 may be present within a cartridge (FIGS. 3C and 3D) that is positionable within coupon insert 140.

Radial coupon positions 142 are located adjacent to blades 136 of impeller 110. As such, metal test coupons housed within radial coupon positions 142 may experience substantial shear forces as the fluid in autoclave chamber 106 is agitated with impeller 110. The rotation rate of impeller 110 may be adjusted to provide a desired amount of shear force upon the faces of the metal test coupons housed within radial coupon positions 142.

Metal test coupons housed within axial coupon positions 144, in contrast, may experience considerably lower shear forces, particularly if impeller 110 is rotating at a rate that does not substantially vortex the fluid. By comparing the extent of corrosion occurring upon radial test coupons compared to axial test coupons, one may determine the extent to which shear forces and circulating solids are influencing the corrosion process. In one embodiment, the influence of shear may be determined by examining (e.g., visually or optically) the type and extent of corrosion occurring upon the axial metal test coupons versus the radial metal test coupons. In another embodiment, axial metal test coupons and radial metal test coupons may be housed in different one-pass fluid trains, and the fluid collected in sampling receptacle 108 within each fluid train may be analyzed to quantify the corrosion taking place in each location.

Figure 3B:
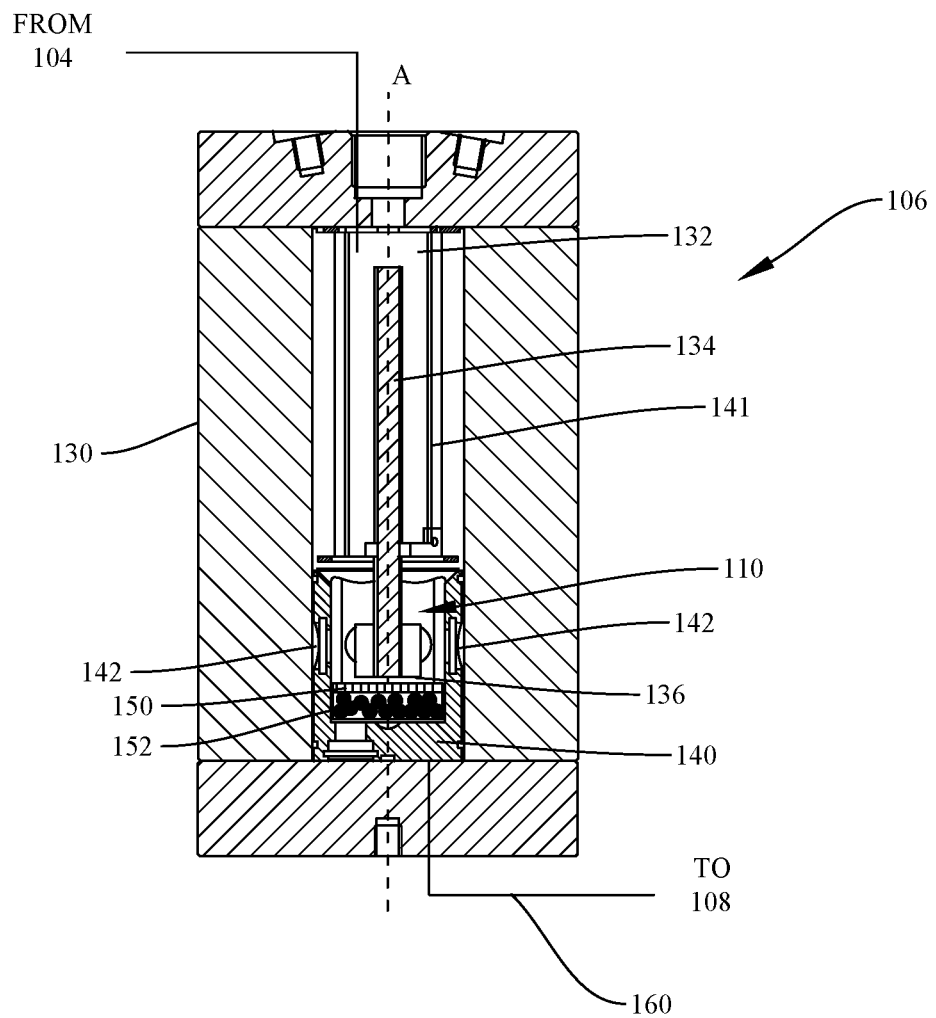
FIG. 3B shows a cross-sectional view of another configuration of an autoclave chamber that may be used in various aspects of the present disclosure.

In addition to inherently experiencing less shear forces by virtue of their location, additional measures may be taken to further limit or eliminate shear forces upon the metal test coupons housed within axial coupon positions 144. Namely, as shown in FIG. 3B, a screen and particulate material may be interposed below the terminus of impeller 110 (i.e., below blades 136) to mitigate shear forces in a section of autoclave chamber 106. Sand, pigging debris, or similar inert particulate materials may be suitable for forming a particulate bed in autoclave chamber 106. The screen and particulate bed may be present in a cartridge that is positionable within coupon insert 140, as shown in FIGS. 3C and 3D.

FIG. 3B shows a cross-sectional view of another configuration of autoclave chamber 106 that may be used in various aspects of the present disclosure, in which screen 150 and particulate material 152 are interposed between the terminus of impeller 110 and radial coupon positions 144 (not visible in the view of FIG. 3B). Screen 150 is configured to retain a bed of particulate material 152 in place at the bottom of coupon insert 140. Screen 150 and particulate material 152 are permeable, thereby allowing the fluid in autoclave chamber 106 to percolate therethrough to contact one or more metal test coupons housed within axial coupon positions 144 (not visible in FIG. 3B). Since particulate material 152 dissipates or substantially precludes a shear condition from being established within a section of autoclave chamber 106 (i.e., below screen 150), metal test coupons residing below the bed of particulate material may experience minimal shear forces thereon. As such, the effects of shear forces upon the corrosion process at various locations may be determined. Furthermore, the presence of solids upon the surface of the metal test coupons can influence biofilm formation and thereby the rate and type of microbial corrosion.

Figure 3C:
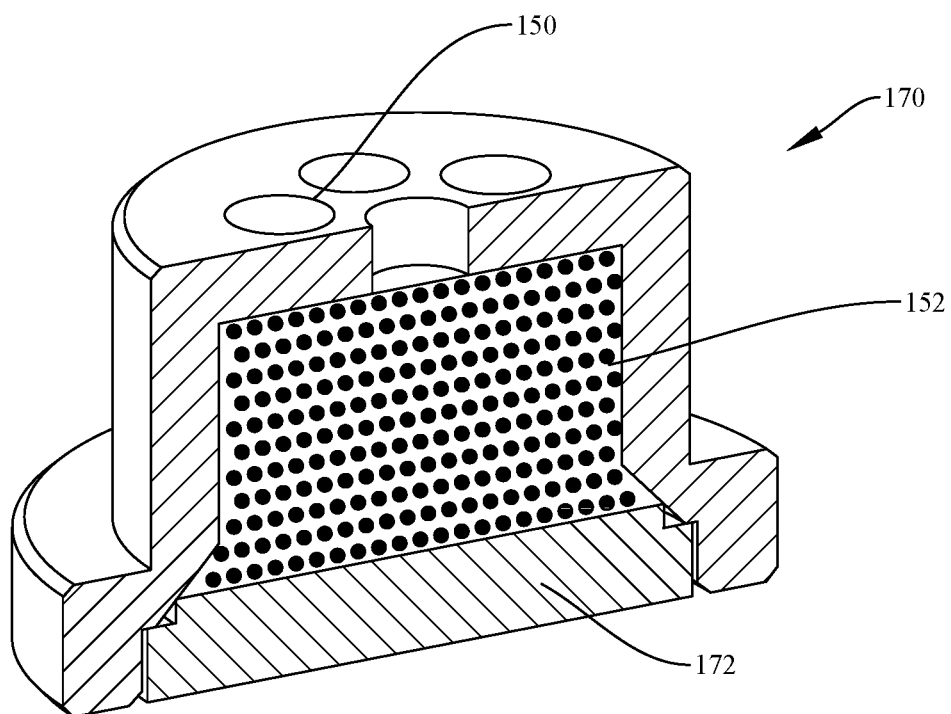
FIGS. 3C and 3D show perspective, cross-sectional views of a cartridge configured to shield metal test coupons from shear forces.
Figure 3D:
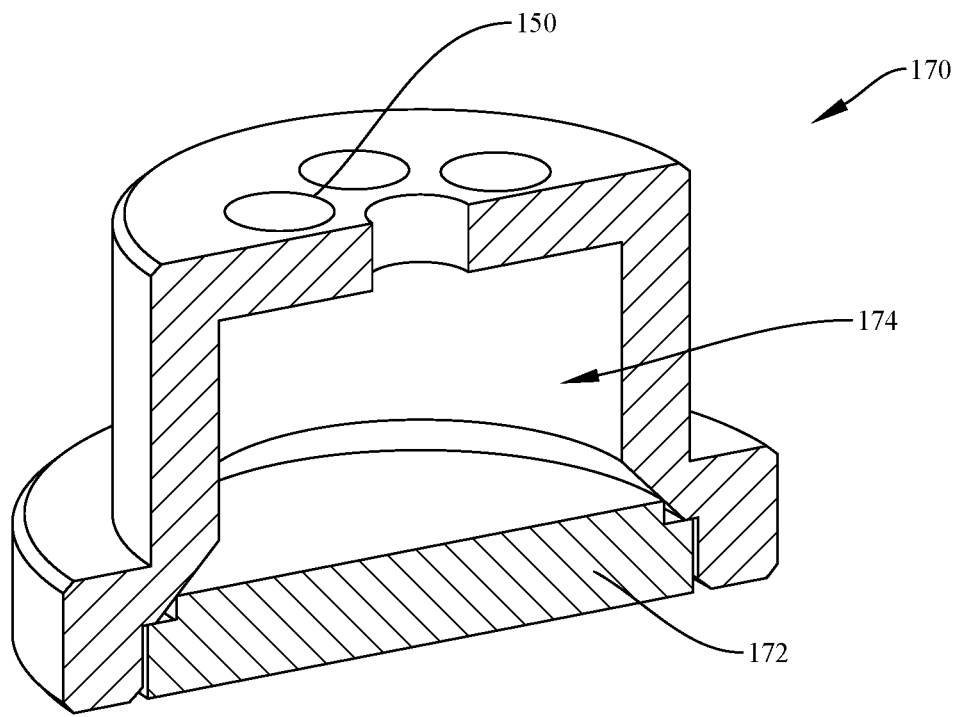

FIGS. 3C and 3D show perspective, cross-sectional views of a cartridge configured to shield metal test coupons from shear forces. As shown, cartridge 170 includes screen 150 on a top surface thereof and particulate material 152 interposed between screen 150 and metal test coupon 172. FIG. 3D shows cartridge 170 with particulate material 152 removed to allow internal volume 174 to be seen. Metal test coupon 172 resides at the bottom of coupon insert 140 (FIGS. 3A and 3B) when positioned therein, such that screen 150 and particulate material 152 are interposed between impeller 110 and metal test coupon 172.

Referring again to FIG. 2, while also making further reference to FIGS. 3A and 3B, once the fluid has been exposed to the metal test coupon(s) in autoclave chamber 106 for a desired length of time, the fluid may be drained from autoclave chamber 106 via transfer line 160. The fluid is then collected in sampling receptacle 108 while still being maintained under anoxic conditions. Fluid transfer may be promoted by a pressure differential between autoclave chamber 106 and sampling receptacle 108. Transfer line 160 may be purged with inert gas to maintain the anoxic conditions. Although FIG. 2 has shown a single sampling receptacle 108, it is to be appreciated that multiple sampling receptacles 108 may be present. Namely, the number of sampling receptacles 108 may correspond to the number of defined volumes of fluid that are dispensed from autoclave chamber 106 following each round of the corrosion testing process. Sampling receptacles 108 may be switched manually to collect each defined volume of fluid from transfer line 160, or an automated process may be used to position and remove sampling receptacles 108 at a desired time.

After being collected, the defined volume of fluid within each sampling receptacle 108 may then undergo analysis, either immediately or after being stored for a period of time. When stored, the fluid may remain under anoxic conditions. Optionally, the fluid may be actively cooled (including freezing) during storage to limit chemical degradation and/or excessive growth of microorganisms therein. In some cases, additional chemical additives may be added to preserve the fluid samples.

Figure 4A:
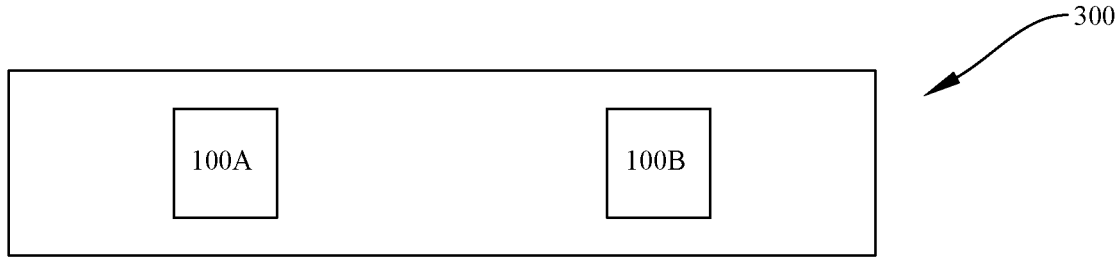
FIG. 4A shows a block diagram of a testing apparatus containing two one-pass fluid trains.
Figure 4B:
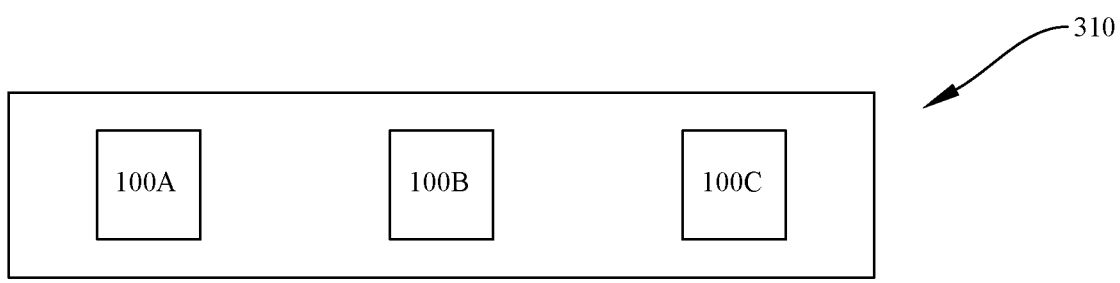
FIG. 4B shows a block diagram of a testing apparatus containing three one-pass fluid trains.

As mentioned previously, the testing apparatuses of the present disclosure may feature one occurrence or more than one occurrence of one-pass fluid train 100 described in detail above. In testing apparatus configurations featuring a single occurrence of one-pass fluid train 100, it is possible to determine whether corrosion indeed did or did not occur. However, a single occurrence of one-pass fluid train 100 is generally insufficient to determine the mechanism through which corrosion occurred. By including a second occurrence of one-pass fluid train 100, in contrast, the relative extents of acid-induced corrosion and microorganism-induced corrosion may be isolated from one another. A third occurrence of one-pass fluid train 100 may be included in the testing apparatuses of the present disclosure to determine the influence of an additional variable upon the corrosion process (e.g., different chemicals, such as particular corrosion inhibitors, or amounts thereof added to the fluid stream passing to pre-conditioning chamber 104, different shear rates, different temperatures, and the like). When multiple occurrences of one-pass fluid train 100 are present, the multiple occurrences of one-pass fluid train 100 may be distinct from one another but structurally similar, while differing in their manner of operation, as discussed elsewhere herein. FIG. 4A shows a block diagram of testing apparatus 300 containing two one-pass fluid trains 100A and 100B, which are distinct from one another and are structurally similar to one-pass fluid train 100, shown in more detail in FIG. 2. Similarly, FIG. 4B shows a block diagram of testing apparatus 310 containing three one-pass fluid trains 100A, 100B and 100C, which are distinct from one another and are structurally similar to one-pass fluid train 100, shown in more detail in FIG. 2.

Having now described testing apparatuses of the present disclosure, methods for operating the testing apparatuses and one-pass fluid trains of the present disclosure will be described in further detail hereinbelow. Testing configurations employing a single one-pass fluid train similar to one-pass fluid train 100 will be described in detail first in order for more complex testing configurations to be better understood. It is to be appreciated that when multiple one-pass fluid trains are present, they may be operated in a similar manner to that provided below for a single one-pass fluid train, with the exception of a different fluid being utilized within each one-pass fluid train. In some instances, minor operational variations may occur when multiple one-pass fluid trains are present, depending on the type of measurement to be conducted, as described further hereinbelow.

Methods for operating the one-pass fluid trains of the present disclosure may comprise: providing a first fluid in a first reservoir maintained at a first temperature state under anoxic conditions; transferring a first fluid stream comprising a defined volume of the first fluid from the first reservoir to a first pre-conditioning chamber in fluid communication with the first reservoir; maintaining the defined volume of the first fluid in the first pre-conditioning chamber under anoxic conditions for a first predetermined conditioning time at a second temperature state different than the first temperature state, the defined volume of the first fluid being pressurized with one or more anoxic gases during the first predetermined conditioning time; transferring the defined volume of the first fluid from the first pre-conditioning chamber to a first autoclave chamber in fluid communication with the first pre-conditioning chamber, the first autoclave chamber containing one or more metal test coupons therein; maintaining the defined volume of the first fluid in the first autoclave chamber at about the second temperature state or a third temperature state under anoxic conditions for a first predetermined testing time, the defined volume of the first fluid being pressurized with one or more anoxic gases and agitated with an impeller in the first autoclave chamber during the first predetermined testing time; and transferring the defined volume of the first fluid from the first autoclave chamber to one or more sampling receptacles in fluid communication with the first autoclave chamber, the one or more sampling receptacles maintaining the defined volume of the first fluid under anoxic conditions.

The first temperature state at which the first fluid is maintained in the first reservoir is generally an actively cooled temperature state, which is generally below the second and/or third temperature state at which the corrosion testing is conducted in the autoclave chamber. In illustrative embodiments, the first fluid may be maintained in the first reservoir at a temperature below room temperature and above freezing point of the first fluid. In more specific embodiments, the first fluid may be maintained in the first reservoir at a temperature from about 10° C. to about −10° C. or from about 15° C. to about 0° C.

The defined volume of the first fluid transferred to the first pre-conditioning chamber may be chosen based upon the volume necessary to conduct corrosion testing within the first autoclave chamber. The defined volume of the first fluid transferred to the first pre-conditioning chamber is usually pre-conditioned and transferred in its entirety to the first autoclave chamber. A suitable defined volume of the first fluid may be chosen, for example, to be sufficient to submerse all of the metal test coupons housed within the first autoclave chamber. Suitable defined volumes of the first fluid may range from about 50 mL to about 1000 mL, or about 100 mL to about 500 mL, or about 125 mL to about 250 mL.

Optionally, the first fluid may be modified with one or more chemicals while being transferred to the first pre-conditioning chamber, as referenced above. More specifically, methods of the present disclosure may comprise delivering one or more chemicals into the first fluid stream while the first fluid stream is being transferred to the first pre-conditioning chamber. Suitable chemicals may include, for example, acids, bases, concentrated salt solutions, organic chemicals, and the like. In more specific process configurations, the one or more chemicals may be one or more oilfield chemicals, which are used in formulating various oilfield fluids using a suitable carrier fluid. The carrier fluid is the first fluid housed in the first fluid reservoir. The oilfield fluid is formulated inline in a batchwise manner as the carrier fluid is transported to the first pre-conditioning chamber. Suitable oilfield chemicals that may be introduced into the first fluid stream during transport to the first pre-conditioning chamber may include, for example, a corrosion inhibitor, a scale inhibitor, a drag reducing agent, a hydrate inhibitor, an oxygen scavenger, a sulfide scavenger, a de-emulsifier, an emulsifier, a surfactant, an anti-foaming agent, a biocide, an acid, a base, or any combination thereof.

Once the defined volume of the first fluid has reached the first pre-conditioning chamber, optionally after being further formulated with other chemicals, the first fluid may be equilibrated to a second temperature state that is different than the first temperature state. In general, the second temperature state represents a higher temperature than the first temperature state. The second temperature state may be the same temperature at which the first fluid will be maintained once transferred to the first autoclave chamber. Typically, the first pre-conditioning chamber and the first autoclave chamber are maintained at the same temperature state (i.e., the second temperature state). Alternately, however, the first pre-conditioning chamber may be operated at a second temperature state that represents an intermediate temperature state differing from the temperature conditions present in the first autoclave chamber, which may be at a higher temperature state or a lower temperature state. That is, the first pre-conditioning chamber and the first autoclave chamber may alternately be in a second temperature state and a third temperature state, respectively, where the second temperature state and the third temperature state differ from one another.

In more specific testing configurations, the first pre-conditioning chamber and the first autoclave chamber may be in a second temperature state that is the same in each location. For example, the second temperature state may range from about 15° C. to about 100° C., or from about 15° C. to about 85° C., or from about 30° C. to about 90° C., or from about 35° C. to about 75° C.

While in the first pre-conditioning chamber, the defined volume of the first fluid may be pressurized with one or more anoxic gases during the pre-determined first conditioning time needed for the first fluid to become equilibrated prior to transfer to the first autoclave chamber. In some embodiments, pressurization with the one or more anoxic gases may comprise saturating the defined volume of the first fluid with the one or more anoxic gases through sparging the one or more anoxic gases into the first fluid in the first pre-conditioning chamber. The one or more anoxic gases may alternately be introduced into the head space above the first fluid in the first pre-conditioning chamber. In more specific embodiments, the one or more anoxic gases sparged into the first fluid may be acid gases (i.e., acid-forming gases), such as carbon dioxide, hydrogen sulfide, or any combination thereof. Introduction of the one or more acid-forming gases to the first fluid may be performed when it is known or expected that the first fluid will be exposed to these gases under operational conditions found in the field. Typical pH values following saturation with the one or more acid-forming gases at pressure may range from about 4 to about 9. The final pH values may be dictated by other components present in the carrier fluid (e.g., other acids or bases, buffers, and the like).

The pressure in the first pre-conditioning chamber and the first autoclave chamber may range from about 15 psi to about 3000 psi, or about 15 psi to about 1000 psi. Suitable pressurization conditions may again be dictated by the expected pressures found under typical operational conditions in the field (e.g., in a pressure vessel or pipeline).

After the first fluid has been equilibrated in the first pre-conditioning chamber, the defined volume of the first fluid may be transferred to the first autoclave chamber to begin corrosion testing therein. Once the first fluid has been transferred to the first autoclave chamber, the first autoclave chamber may remain sealed, pressurized and heated while the first fluid is contacted with the metal test coupons housed therein. Optional cooling of the first autoclave chamber may take place if the temperature becomes excessive, such as due to rotation of the impeller. Anoxic conditions may be maintained in the first autoclave chamber with the anoxic gas or one or more acid-forming gases maintained in a head space above the first fluid.

The first fluid may be agitated with an impeller in order to introduce shear forces upon the metal test coupons in the autoclave chamber. The shear forces may arise due to circulation of the fluid and its interaction with the faces of the metal test coupons. The shear forces produced in the first autoclave chamber may be similar to those that are encountered during operational use in the field (e.g., for a fluid flowing in a pipeline). Rotation rates for the impeller may be chosen such that shear stress values in the first autoclave chamber range from about 0 Pa to about 300 Pa, or about 0 Pa to about 100 Pa, or about 0.1 Pa to about 50 Pa, or about 1 Pa to about 40 Pa. The impeller may also remain static in some testing configurations, if imparting a shear condition to the first fluid is unnecessary.

Once the defined volume of the first fluid has been drained from the first pre-conditioning chamber, a fresh quantity of the defined volume of the first fluid may be introduced to the first pre-conditioning chamber. The fresh quantity may be introduced immediately after an initial quantity of the first fluid has been drained, or the fresh quantity may be introduced later. For example, if fluid exchanges within the first autoclave chamber are performed over very short time intervals, it may be advantageous to begin equilibrating the fresh quantity of the first fluid as soon as possible to minimize the possibility of system downtime and/or minimizing the possibility of leaving the first autoclave chamber fluid-free for too long. If fluid exchanges are performed less regularly, such as after a fluid residence time of multiple hours or days in the first autoclave chamber, it is not necessary to introduce the fresh quantity of fluid into the first pre-conditioning chamber immediately after transferring the initial quantity of the first fluid to the first autoclave chamber. In fact, it may be desirable to load the first pre-conditioning chamber with the fresh quantity of the first fluid at a time fairly close to when it is actually needed for introduction to the first autoclave chamber, since the heated conditions in the first pre-conditioning chamber may otherwise promote unwanted fluid degradation and/or microorganism growth prior to reaching the first autoclave chamber.

The defined volume of the first fluid in the first autoclave chamber may be withdrawn and replaced with a fresh quantity of the first fluid at predetermined intervals. The length of time each quantity of the first fluid is allowed to remain in the first autoclave chamber may be the same or vary for each quantity. Moreover, the amount of time each quantity of the first fluid is allowed to remain in the first autoclave chamber may be the same or vary based upon various operational considerations. For example, the amount of time may be varied based upon how corrosive the first fluid is expected to be to the metal test coupons. In various process configurations, the amount of time that each quantity of the first fluid is allowed to remain in the first autoclave chamber may range from about 5 minutes to about 7 days, or about 10 minutes to about 120 minutes, or about 20 minutes to about 90 minutes, or about 30 minutes to about 60 minutes, or about 1 hour to about 24 hours, or about 2 hours to about 12 hours, or about 1 hour to about 4 hours, or about 3 hours to about 8 hours. The minimum amount of time that the first fluid may remain in the first autoclave chamber represents the amount of time necessary to fill the first autoclave chamber with the first fluid and subsequently drain the first autoclave chamber.

Each quantity of the first fluid is transferred from the first autoclave chamber to a corresponding number of one or more sampling receptacles that are in fluid communication with the first autoclave chamber, with the first fluid again being maintained under anoxic conditions while in the one or more sampling receptacles. Each quantity of the first fluid may be transferred to one sampling receptacle or to multiple sampling receptacles, depending upon particular testing needs. For example, if each quantity of the first fluid is to be analyzed using a single test, collecting the first fluid in a single sampling receptacle may be feasible. However, if multiple tests will be conducted on the first fluid following exposure to the metal test coupons (e.g., different types of analyses or replicates of the same analysis), sub-dividing each quantity of the first fluid into multiple sampling receptacles may be more advantageous. Collecting separate portions of the first fluid in multiple sampling receptacles also may decrease the risk of inadvertent contamination or loss of the entire quantity of the first fluid obtained from each round of corrosion testing.

Once the first fluid has been collected in the one or more sampling receptacles, methods of the present disclosure may further comprise analyzing for symptoms of corrosion within the metal test coupons by assaying the defined volume of the first fluid obtained from the one or more sampling receptacles. Assaying for symptoms of corrosion may comprise performing an analysis for one or more metals, determining a load of particular corrosion-causing microorganisms within the first fluid, performing an analysis for one or more biomarkers characteristic of corrosion-causing microorganisms, or any combination thereof.

When performing an analysis for one or more metals, symptoms of corrosion may include ongoing detection of metals in the first fluid over time. The metal concentration may remain static or change over time when analyzing subsequent portions of the first fluid. Detection of one or more metals in the first fluid (e.g., iron or manganese) may be indicative of corrosion occurring through dissolution or pitting of the metal test coupons within the first autoclave chamber. While the detection of metals may be indicative of corrosion, the metal concentration alone does not provide direct information of the mechanism through which the corrosion occurred. Suitable techniques of analyzing for one or more metals include, for example, atomic absorption spectroscopy, inductive coupled plasma spectroscopy, wet chemical analyses, and the like.

Determining a load of corrosion-causing microorganisms may be performed by standard biological assay techniques. Such techniques may be specific to particular microorganisms and will be familiar to one having ordinary skill in the art. In addition, or alternately, one or more biomarkers of a corrosion-causing microorganism may be assayed in order to determine if symptoms of corrosion are present within the first fluid collected in the one or more sampling receptacles. Biomarkers that may be analyzed according to the present disclosure include, but are not limited to, DNA, RNA, proteins, metabolites, or any combination thereof. Like the microorganisms themselves, such biomarkers may be characteristic of particular corrosion-causing microorganisms and the presence of the biomarkers may provide evidence of possible corrosion. It should be noted, however, that the mere presence of corrosion-causing microorganisms and/or biomarkers associated therewith is not definitive evidence that corrosion is actually taking place. Moreover, like analyses for one or more metals, the presence of microorganisms and/or biomarkers associated therewith does not provide direct evidence of the mechanism by which corrosion may have occurred.

In view of the foregoing, the methods of the present disclosure may be conducted upon a single fluid (first fluid) to determine if corrosion of the metal test coupons is occurring. Advantageously, the methods of the present disclosure may further feature analyzing a second fluid to determine the relative amounts of acid-induced corrosion versus microorganism-induced corrosion and/or analyzing a third fluid to determine the effects of introducing particular additives to the third fluid, such as corrosion-inhibiting additives. In order to make direct comparisons between the first fluid and the second fluid and/or the third fluid within separate one-pass fluid trains, the fluids may feature a carrier fluid that is obtained from a common compositional source (i.e., the same batch of fluid or from the same location).

Transit of the second fluid and/or the third fluid from their corresponding reservoirs and autoclave chambers may take place similarly to that described above for the first fluid. Likewise, analysis of the second fluid and/or the third fluid may take place similarly to that described above for the first fluid. Therefore, these operations are not repeated in detail again in the interest of brevity. Instead, differences between the second fluid and the third fluid, how the fluids are processed, and how one uses the analyses to determine the mechanism and/or effect on corrosion are described in more detail hereinafter.

The second fluid may be located in a second one-pass fluid train and may be used to isolate the influence of acid-induced corrosion. Specifically, the second fluid may be sterilized prior to loading the second fluid in the second reservoir. The sterilization technique for the second fluid is not considered to be particularly limited, provided that the sterilization technique itself does not lead to corrosion or reduce corrosion (i.e., change the $C_A$ term of Equation 1). Suitable sterilization techniques may include for example, heating, addition of chemicals, irradiation, and/or filtration to remove one or more types of microorganisms. Optionally, the second fluid may contain at least one of a biocide, an antibiotic substance, and thimerosal, which may be added concurrently with or after other types of sterilization techniques have been conducted.

When the second fluid has been sterilized, the microorganism-induced corrosion $C_M$ is zero, and the total corrosion $C_T$ equals the acid-induced corrosion $C_A$, as shown in Equation 2, $$C_T = C_A \quad \text{(Equation 2)}$$

Therefore, by measuring at least one test parameter of the first fluid associated with total corrosion (e.g., a metals analysis, a microorganism load, and/or a biomarker) and also measuring a corresponding parameter in the second fluid, the amount of each type of corrosion may be determined according to Equation 3, $$C_M = C_{T,1} - C_{T,2} \quad \text{(Equation 3)}$$

wherein $C_{T,1}$ is the total corrosion measured for the first fluid and $C_{T,2}$ is the total corrosion measured for the second fluid. Since no microorganism-induced corrosion occurs in the second fluid, $C_{T,2}$ is equivalent to $C_A$, the amount of acid-induced corrosion. Therefore, the remaining contribution to corrosion in the first fluid is due to microorganism-induced corrosion.

Accordingly, methods of the present disclosure may comprise measuring at least one test parameter of the first fluid and the second fluid, quantifying a difference in a measured value of the at least one test parameter between the first fluid and the second fluid, and determining an underlying source of corrosion within the one or more metal test coupons, wherein the difference in the measured value of the at least one test parameter correlates to the underlying source of corrosion. As indicated above, such methods may comprise determining the relative amounts of microorganism-induced corrosion ($C_M$) and acid-induced corrosion ($C_A$) from the difference in the measured value of the at least one test parameter in the first fluid and the second fluid.

The third fluid may be used to determine how well a particular corrosion-inhibiting additive, for example, influences the corrosion of the metal test coupons. Since the testing methods described herein may closely simulate the corrosive conditions occurring in the field, the testing methods may be much more predictive of the performance of the additive than is possible using current corrosion testing methods. The third fluid may be tested in conjunction with the first fluid (possibly having both acid-induced corrosion and microorganism-induced corrosion) and/or the second fluid (sterilized fluid only capable of having acid-induced corrosion). That, is the third fluid may be used to determine the effectiveness of the additive against total corrosion (comparison against only the first fluid), against acid-induced corrosion (comparison against only the second fluid), or against both acid-induced corrosion and microorganism-induced corrosion (comparison against both the first fluid and the second fluid). The third fluid may be sterilized or unsterilized based on particular testing requirements.

Accordingly, certain methods of the present disclosure may comprise measuring at least one test parameter of the first fluid and the third fluid, the third fluid comprising an additive that is not present in the first fluid, quantifying a difference in a measured value of the at least one test parameter between the first fluid and the third fluid, and determining an effect of the additive upon corrosion of the one or more metal test coupons, wherein the difference in the measured value correlates to a magnitude of the effect upon corrosion. Additionally or alternately, methods of the present disclosure may comprise measuring at least one test parameter of the second fluid and the third fluid, the second fluid being sterilized and the third fluid comprising an additive that is not present in the first fluid, quantifying a difference in a measured value of the at least one test parameter between the second fluid and the third fluid, and determining an effect of the additive upon microorganism-induced corrosion of the one or more metal test coupons, wherein the difference in the measured value correlates to a magnitude of the effect upon the microorganism-induced corrosion.

In order to make direct comparisons when different fluids are present in multiple one-pass fluid trains, the predetermined testing time in each one-pass fluid train may be about the same. Similarly, the predetermined conditioning time in each one-pass fluid train may also be about the same when multiple one-pass fluid trains are present. Likewise, the pre-conditioning chamber and the autoclave chamber in each one-pass fluid train may be configured to operate at about the same temperature (i.e., a second temperature state) when multiple one-pass fluid trains are present.

Some methods of the present disclosure may place each defined volume of fluid under a shear condition while in the autoclave chambers. In some cases, all of the metal test coupons in the autoclave chamber may experience a shear force upon at least one face of the metal test coupons by virtue of their positioning in the autoclave chamber while the fluid is under a shear condition. In other cases, none of the metal test coupons may experience a shear force by virtue of their positioning in the autoclave chamber, even when the fluid therein is under a shear condition. In still other cases, a first portion of the metal test coupons may experience a shear force and a second portion of the metal test coupons may not experience a shear force, with the positioning of the metal test coupons again determining whether a shear force is experienced by the metal test coupons or not.

Methods of the present disclosure may comprise positioning the metal test coupons in a location to experience a desired amount of shear force. In some embodiments, a first portion of the metal test coupons may be located in a first section of the autoclave chamber that is exposed to a shear condition and a second portion of the metal test coupons may be located in a second section of the autoclave chamber that is isolated from the shear condition. More specifically, the first section and the second section of one or more of the autoclave chambers may be separated by a screen, with the second section of the autoclave chamber(s) containing a particulate material that is retained behind the screen. The particulate material forms a porous bed, thereby allowing the fluid in the autoclave chamber to percolate through the particulate material and contact the metal test coupons when the metal test coupons are located behind the screen and below a bed of the particulate material. The particulate material substantially precludes the shear condition being established in the fluid in the second section while the fluid is contacting the metal test coupons.

Methods of the present disclosure may further comprise actively cooling the reservoir(s) containing the fluid(s) subsequently transferred from the reservoir to the corresponding pre-conditioning chamber(s) and autoclave chamber(s). Active cooling may be at any temperature below room temperature and above the freezing point of the fluid. In more specific embodiments, active cooling may take place at a temperature of about 10° C. to about −10° C. or about 15° C. to about 0° C. When multiple reservoirs are present in multiple one-pass fluid trains, they may all be maintained at substantially the same temperature under active cooling conditions.

Embodiments disclosed herein include:

A. Testing apparatuses. The testing apparatuses comprise: a first one-pass fluid train comprising: a first reservoir configured to maintain a first fluid at a first temperature state under anoxic conditions, a first pre-conditioning chamber in fluid communication with the first reservoir and configured to receive a first fluid stream comprising a defined volume of the first fluid from the first reservoir, a first autoclave chamber in fluid communication with the first pre-conditioning chamber and configured to receive the defined volume of the first fluid from the first pre-conditioning chamber, the first autoclave chamber having an impeller located therein, and one or more sampling receptacles in fluid communication with the first autoclave chamber and configured to receive the defined volume of the first fluid from the first autoclave chamber and to maintain the defined volume of the first fluid under anoxic conditions; wherein the first pre-conditioning chamber and the first autoclave chamber are configured to be maintained under anoxic conditions at a second temperature state different than the first temperature state, or the first pre-conditioning chamber and the first autoclave chamber are configured to be maintained under anoxic conditions at the second temperature state and a third temperature state, respectively, which are each different than the first temperature state.

B. Testing methods. The methods comprise: providing a first fluid in a first reservoir maintained at a first temperature state under anoxic conditions; transferring a first fluid stream comprising a defined volume of the first fluid from the first reservoir to a first pre-conditioning chamber in fluid communication with the first reservoir; maintaining the defined volume of the first fluid in the first pre-conditioning chamber under anoxic conditions for a first predetermined conditioning time at a second temperature state different than the first temperature state, the defined volume of the first fluid being pressurized with one or more anoxic gases during the first predetermined conditioning time; transferring the defined volume of the first fluid from the first pre-conditioning chamber to a first autoclave chamber in fluid communication with the first pre-conditioning chamber, the first autoclave chamber containing one or more metal test coupons therein; maintaining the defined volume of the first fluid in the first autoclave chamber at about the second temperature state or a third temperature state under anoxic conditions for a first predetermined testing time, the defined volume of the first fluid being pressurized with one or more anoxic gases and agitated with an impeller in the first autoclave chamber during the first predetermined testing time; and transferring the defined volume of the first fluid from the first autoclave chamber to one or more sampling receptacles in fluid communication with the first autoclave chamber, the one or more sampling receptacles maintaining the defined volume of the first fluid under anoxic conditions.

Embodiments A and B may have one or more of the following additional elements in any combination:

Element 1: wherein the testing apparatus further comprises: at least one second one-pass fluid train separate from the first one-pass fluid train, the at least one second one-pass fluid train comprising: a second reservoir configured to maintain a second fluid at about the first temperature state under anoxic conditions, a second pre-conditioning chamber in fluid communication with the second reservoir and configured to receive a second fluid stream comprising a defined volume of the second fluid from the second reservoir, a second autoclave chamber in fluid communication with the second pre-conditioning chamber and configured to receive the defined volume of the second fluid from the second pre-conditioning chamber, the second autoclave chamber having an impeller located therein, and one or more sampling receptacles in fluid communication with the second autoclave chamber and configured to receive the defined volume of the second fluid from the second autoclave chamber and to maintain the defined volume of the second fluid under anoxic conditions; wherein the second pre-conditioning chamber and the second autoclave chamber are configured to be maintained under anoxic conditions at about the second temperature state, which is different than the first temperature state, or the second pre-conditioning chamber and the second autoclave chamber are configured to be maintained under anoxic conditions at about the second temperature state and a third temperature state, respectively, which are each different than the first temperature state.

Element 2: wherein the testing apparatus further comprises: at least one third one-pass fluid train separate from the first one-pass fluid train and the second one-pass fluid train, the at least one third one-pass fluid train comprising: a third reservoir configured to maintain a third fluid at about the first temperature state under anoxic conditions, a third pre-conditioning chamber in fluid communication with the third reservoir and configured to receive a third fluid stream comprising a defined volume of the third fluid from the third reservoir, a third autoclave chamber in fluid communication with the third pre-conditioning chamber and configured to receive the defined volume of the third fluid from the third pre-conditioning chamber, the third autoclave chamber having an impeller located therein, and one or more sampling receptacles in fluid communication with the third autoclave chamber and configured to receive the defined volume of the third fluid from the third autoclave chamber and to maintain the defined volume of the third fluid under anoxic conditions; wherein the third pre-conditioning chamber and the third autoclave chamber are configured to be maintained under anoxic conditions at about the second temperature state, which is different than the first temperature state, or the third pre-conditioning chamber and the third autoclave chamber are configured to be maintained under anoxic conditions at about the second temperature state and a third temperature state, respectively, which are each different than the first temperature state.

Element 3: wherein the at least one second one-pass fluid train comprises two one-pass fluid trains that are separate from one another and from the first one-pass fluid train, the two one-pass fluid trains containing the second fluid and a third fluid, respectively.

Element 4: wherein the testing apparatus further comprises: one or more inlets configured to deliver one or more chemicals to at least one of the fluid streams.

Element 5: wherein the one or more chemicals include one or more members selected from the group consisting of a corrosion inhibitor, a scale inhibitor, a drag reducing agent, a hydrate inhibitor, an oxygen scavenger, a sulfide scavenger, a de-emulsifier, an emulsifier, a surfactant, an anti-foaming agent, a biocide, an acid, a base, and any combination thereof.

Element 6: wherein a gas sparging line is in fluid communication with at least one of the pre-conditioning chambers.

Element 7: wherein a gas sparger is housed in at least one of the pre-conditioning chambers, the gas sparger being in fluid communication with the gas sparging line.

Element 8: wherein at least one of the autoclave chambers comprises a first section and a second section that are separated from one another by a screen, the first section containing the impeller and the second section being configured to retain a particulate material behind the screen.

Element 9: wherein at least one of the autoclave chambers is configured to retain one or more metal test coupons within the second section behind the screen and below a bed of the particulate material.

Element 9': wherein the one or more metal test coupons are housed in a cartridge also containing the screen and the particulate material, the cartridge being positionable in a coupon insert within the autoclave chamber.

Element 10: wherein at least one of the autoclave chambers is configured to retain one or more metal test coupons therein.

Element 11: wherein the reservoirs are actively cooled.

Element 12: wherein the pre-conditioning chambers and the autoclave chambers are configured to operate at about the same temperature and in a pressurized state.

Element 13: wherein the method further comprises: providing a second fluid in a second reservoir maintained at about the first temperature state under anoxic conditions, the second fluid differing in composition from the first fluid; transferring a second fluid stream comprising a defined volume of the second fluid from the second reservoir to a second pre-conditioning chamber in fluid communication with the second reservoir; maintaining the defined volume of the second fluid in the second pre-conditioning chamber under anoxic conditions for a second predetermined conditioning time at about the second temperature state, which is different than the first temperature state, the defined volume of the second fluid being pressurized with one or more anoxic gases during the second predetermined conditioning time; transferring the defined volume of the second fluid from the second pre-conditioning chamber to a second autoclave chamber in fluid communication with the second pre-conditioning chamber, the second autoclave chamber containing one or more metal test coupons therein; maintaining the defined volume of the second fluid in the second autoclave chamber at about the second temperature state or a third temperature state under anoxic conditions for a second predetermined testing time, the defined volume of the second fluid being pressurized with one or more anoxic gases and agitated with an impeller in the second autoclave chamber during the second predetermined testing time; and transferring the defined volume of the second fluid from the second autoclave chamber to one or more sampling receptacles in fluid communication with the second autoclave chamber, the one or more sampling receptacles maintaining the defined volume of the second fluid under anoxic conditions.

Element 14: wherein the first predetermined conditioning time and the second predetermined conditioning time are about the same, and the first predetermined testing time and the second predetermined testing time are about the same.

Element 15: wherein the method further comprises: providing a third fluid in a third reservoir maintained at about the first temperature state under anoxic conditions, the third fluid differing in composition from the first fluid and the second fluid; transferring a third fluid stream comprising a defined volume of the third fluid from the third reservoir to a third pre-conditioning chamber in fluid communication with the third reservoir; maintaining the defined volume of the third fluid in the third pre-conditioning chamber under anoxic conditions for a third predetermined conditioning time at about the second temperature state, which is different than the first temperature state, the defined volume of the third fluid being pressurized with one or more anoxic gases during the third predetermined conditioning time; transferring the defined volume of the third fluid from the third pre-conditioning chamber to a third autoclave chamber in fluid communication with the third pre-conditioning chamber, the third autoclave chamber containing one or more metal test coupons therein; maintaining the defined volume of the third fluid in the third autoclave chamber at about the second temperature state or a third temperature state under anoxic conditions for a third predetermined testing time, the defined volume of the third fluid being pressurized with one or more anoxic gases and agitated with an impeller in the third autoclave chamber during the third predetermined testing time; and transferring the defined volume of the third fluid from the third autoclave chamber to one or more sampling receptacles in fluid communication with the third autoclave chamber, the one or more sampling receptacles maintaining the defined volume of the third fluid under anoxic conditions.

Element 16: wherein the first predetermined conditioning time, the second predetermined conditioning time, and the third predetermined conditioning time are about the same, and the first predetermined testing time, the second predetermined testing time, and the third predetermined testing time are about the same.

Element 17: wherein each fluid comprises a carrier fluid that is obtained from a common compositional source.

Element 18: wherein the anoxic gas is sparged into each pre-conditioning chamber.

Element 19: wherein the method further comprises: analyzing for symptoms of corrosion within the metal test coupons by assaying the defined volumes of at least one of the fluids obtained from the one or more sampling receptacles.

Element 20: wherein assaying the defined volumes of at least one of the fluids comprises performing an analysis for one or more metals.

Element 21: wherein assaying the defined volumes of at least one of the fluids comprises performing an analysis for one or more biomarkers characteristic of a corrosion-causing microorganism.

Element 22: wherein the one or more biomarkers are selected from the group consisting of DNA, RNA, a protein, a metabolite, and any combination thereof.

Element 23: wherein the first fluid contains at least one type of microorganism and the second fluid is sterilized, the second fluid optionally containing at least one of a biocide, thimerosal, and an antibiotic substance.

Element 24: wherein the method further comprises: measuring at least one test parameter of the first fluid and the second fluid; quantifying a difference in a measured value of the at least one test parameter between the first fluid and the second fluid; and determining an underlying source of corrosion within the one or more metal test coupons, the difference in the measured value of the at least one test parameter correlating to the underlying source of corrosion.

Element 25: wherein the method further comprises: determining a relative extent of microorganism-induced corrosion and acid-induced corrosion from the difference in the measured value.

Element 26: wherein the method further comprises: measuring at least one second test parameter of the first fluid and the third fluid, the third fluid comprising an additive that is not present in the first fluid; quantifying a difference in a measured value of the at least one second test parameter between the first fluid and the third fluid; and determining an effect of the additive upon corrosion within the one or more metal test coupons, the difference in the measured value of the at least one second test parameter correlating to a magnitude of the effect upon corrosion.

Element 27: wherein the method further comprises: delivering one or more chemicals into at least one of the fluid streams.

Element 28: wherein the one or more chemicals include one or more members selected from the group consisting of a corrosion inhibitor, a scale inhibitor, a drag reducing agent, a hydrate inhibitor, an oxygen scavenger, a sulfide scavenger, a de-emulsifier, an emulsifier, a surfactant, an anti-foaming agent, a biocide, an acid, a base, and any combination thereof.

Element 29: wherein each defined volume of fluid is under a shear condition while in the autoclave chambers.

Element 30: wherein a first section of each autoclave chamber is exposed to the shear condition and a second section of each autoclave chamber is isolated from the shear condition.

Element 31: wherein the first section and the second section of each autoclave chamber are separated by a screen, and the second section of each autoclave chamber contains a particulate material retained behind the screen.

Element 31': wherein the screen and the particulate material are in housed in a cartridge that is positionable in a coupon insert within the autoclave chamber.

Element 32: wherein at least a portion of the one or more metal test coupons in each autoclave chamber are retained within the second section behind the screen and below a bed of the particulate material.

Element 33: wherein the method further comprises: actively cooling each reservoir.

Element 34: wherein each operation of transferring and maintaining is performed multiple times with multiple defined volumes of each fluid.

Element 35: wherein each pre-conditioning chamber and each autoclave chamber are maintained at about the second temperature state.

Element 36: wherein each operation of transferring and maintaining is performed in an automated fashion.

Element 1A: wherein the testing apparatuses further comprise: one or more inlets configured to deliver one or more chemicals to the first fluid stream.

Element 2A: wherein the one or more chemicals include one or more members selected from the group consisting of a corrosion inhibitor, a scale inhibitor, a drag reducing agent, a hydrate inhibitor, an oxygen scavenger, a sulfide scavenger, a de-emulsifier, an anti-foaming agent, a biocide, an acid, a base, a surfactant, and any combination thereof.

Element 3A: wherein a gas sparging line is in fluid communication with the first pre-conditioning chamber.

Element 4A: wherein a gas sparger is housed in the first pre-conditioning chamber, the gas sparger being in fluid communication with the gas sparging line.

Element 5A: wherein the first autoclave chamber comprises a first section and a second section that are separated from one another by a screen, the first section containing the impeller and the second section being configured to retain a particulate material behind the screen.

Element 6A: wherein the first autoclave chamber is configured to retain one or more metal test coupons within the second section behind the screen and below a bed of the particulate material.

Element 6A': wherein the one or more metal test coupons are housed in a cartridge also containing the screen and the particulate material, the cartridge being positionable in a coupon insert within the first autoclave chamber.

Element 7A: wherein the first autoclave chamber is configured to retain one or more metal test coupons therein.

Element 8A: wherein the first reservoir is actively cooled.

Element 9A: wherein the first pre-conditioning chamber and the first autoclave chamber are configured to operate at about the same temperature and in a pressurized state.

Element 10A: wherein the testing apparatus further comprises: a second one-pass fluid train separate from the first one-pass fluid train, the second one-pass fluid train comprising: a second reservoir configured to maintain a second fluid at about the first temperature state under anoxic conditions, a second pre-conditioning chamber in fluid communication with the second reservoir and configured to receive a second fluid stream comprising a defined volume of the second fluid from the second reservoir, a second autoclave chamber in fluid communication with the second pre-conditioning chamber and configured to receive the defined volume of the second fluid from the second pre-conditioning chamber, the second autoclave chamber having an impeller located therein, and one or more sampling receptacles in fluid communication with the second autoclave chamber and configured to receive the defined volume of the second fluid from the second autoclave chamber and to maintain the defined volume of the second fluid under anoxic conditions; wherein the second pre-conditioning chamber and the second autoclave chamber are configured to be maintained under anoxic conditions at about the second temperature state, which is different than the first temperature state, or the second pre-conditioning chamber and the second autoclave chamber are configured to be maintained under anoxic conditions at about the second temperature state and a third temperature state, respectively, which are each different than the first temperature state.

Element 11A: wherein the testing apparatus further comprises: one or more inlets configured to deliver one or more chemicals to the second fluid stream.

Element 12A: wherein the one or more chemicals include one or more members selected from the group consisting of a corrosion inhibitor, a scale inhibitor, a drag reducing agent, a hydrate inhibitor, an oxygen scavenger, a sulfide scavenger, a de-emulsifier, an anti-foaming agent, a biocide, an acid, a base, a surfactant, and any combination thereof.

Element 13A: wherein a gas sparging line is in fluid communication with the second pre-conditioning chamber.

Element 14A: wherein a gas sparger is housed in the second pre-conditioning chamber, the gas sparger being in fluid communication with the gas sparging line.

Element 15A: wherein the second autoclave chamber comprises a first section and a second section that are separated from one another by a screen, the first section containing the impeller and the second section being configured to retain a particulate material behind the screen.

Element 16A: wherein the second autoclave chamber is configured to retain one or more metal test coupons within the second section behind the screen and below a bed of the particulate material.

Element 16A': wherein the one or more metal test coupons are housed in a cartridge also containing the screen and the particulate material, the cartridge being positionable in a coupon insert within the second autoclave chamber.

Element 17A: wherein the second autoclave chamber is configured to retain one or more metal test coupons therein.

Element 18A: wherein the second reservoir is actively cooled.

Element 19A: wherein the first pre-conditioning chamber, the second pre-conditioning chamber, the first autoclave chamber, and the second autoclave chamber are configured to operate at about the same temperature and in a pressurized state.

Element 20A: wherein the testing apparatus further comprises: a third one-pass fluid train separate from the first one-pass fluid train and the second one-pass fluid train, the third one-pass fluid train comprising: a third reservoir configured to maintain a third fluid at about the first temperature state under anoxic conditions, a third pre-conditioning chamber in fluid communication with the third reservoir and configured to receive a third fluid stream comprising a defined volume of the third fluid from the third reservoir, a third autoclave chamber in fluid communication with third pre-conditioning chamber and configured to receive the defined volume of the third fluid from the third pre-conditioning chamber, the third autoclave chamber having an impeller located therein, and one or more sampling receptacles in fluid communication with the third autoclave chamber and configured to receive the defined volume of the third fluid from the third autoclave chamber and to maintain the defined volume of the third fluid under anoxic conditions; wherein the third pre-conditioning chamber and the third autoclave chamber are configured to be maintained under anoxic conditions at about the second temperature state, which is different than the first temperature state, or the third pre-conditioning chamber and the third autoclave chamber are configured to be maintained under anoxic conditions at about the second temperature state and a third temperature state, respectively, which are each different than the first temperature state.

Element 21A: wherein the testing apparatus further comprises: one or more inlets configured to deliver one or more chemicals to the third fluid stream.

Element 22A: wherein the one or more chemicals include one or more members selected from the group consisting of a corrosion inhibitor, a scale inhibitor, a drag reducing agent, a hydrate inhibitor, an oxygen scavenger, a sulfide scavenger, a de-emulsifier, an anti-foaming agent, a biocide, an acid, a base, a surfactant, and any combination thereof.

Element 23A: wherein a gas sparging line is in fluid communication with the third pre-conditioning chamber.

Element 24A: wherein a gas sparger is housed in the third pre-conditioning chamber, the gas sparger being in fluid communication with the gas sparging line.

Element 25A: wherein the third autoclave chamber comprises a first section and a second section that are separated from one another by a screen, the first section containing the impeller and the second section being configured to retain a particulate material behind the screen.

Element 26A: wherein the third autoclave chamber is configured to retain one or more metal test coupons within the second section behind the screen and below a bed of the particulate material.

Element 26A': wherein the one or more metal test coupons are housed in a cartridge also containing the screen and the particulate material, the cartridge being positionable in a coupon insert within the third autoclave chamber.

Element 27A: wherein the third autoclave chamber is configured to retain one or more metal test coupons therein.

Element 28A: wherein the third reservoir is actively cooled.

Element 29A: wherein the first pre-conditioning chamber, the second pre-conditioning chamber, the third pre-conditioning chamber, the first autoclave chamber, the second autoclave chamber, and the third autoclave chamber are configured to operate at about the same temperature and in a pressurized state.

Element 30A: wherein the anoxic gas is sparged into the first pre-conditioning chamber.

Element 31A: wherein the method further comprises: analyzing for symptoms of corrosion within the metal test coupons by assaying the defined volume of the first fluid obtained from the one or more sampling receptacles.

Element 32A: wherein assaying the defined volume of the first fluid comprises performing an analysis for one or more metals.

Element 33A: wherein assaying the defined volume of the first fluid comprises performing an analysis for one or more biomarkers characteristic of a corrosion-causing microorganism.

Element 34A: wherein the one or more biomarkers are selected from the group consisting of DNA, RNA, a protein, a metabolite, and any combination thereof.

Element 35A: wherein the method further comprises: delivering one or more chemicals into the first fluid stream.

Element 36A: wherein the one or more chemicals include one or more members selected from the group consisting of a corrosion inhibitor, a scale inhibitor, a drag reducing agent, a hydrate inhibitor, an oxygen scavenger, a sulfide scavenger, a de-emulsifier, an anti-foaming agent, a biocide, an acid, a base, a surfactant, and any combination thereof.

Element 37A: wherein the defined volume of the first fluid is under a shear condition while in the first autoclave chamber.

Element 38A: wherein a first section of the first autoclave chamber is exposed to the shear condition and a second section of the first autoclave chamber is isolated from the shear condition.

Element 39A: wherein the first section and the second section are separated by a screen, and the second section contains a particulate material retained behind the screen.

Element 40A: wherein at least a portion of the one or more metal test coupons are retained within the second section behind the screen and below a bed of the particulate material.

Element 40A': wherein the screen and the particulate material are in housed in a cartridge that is positionable in a coupon insert within the first autoclave chamber.

Element 41A: wherein the method further comprises: actively cooling the first reservoir.

Element 42A: wherein each operation of transferring and maintaining is performed multiple times with multiple defined volumes of the first fluid.

Element 43A: wherein the method further comprises: providing a second fluid in a second reservoir maintained at about the first temperature state under anoxic conditions, the second fluid differing in composition from the first fluid; transferring a second fluid stream comprising a defined volume of the second fluid from the second reservoir to a second pre-conditioning chamber in fluid communication with the second reservoir; maintaining the defined volume of the second fluid in the second pre-conditioning chamber under anoxic conditions for a second predetermined conditioning time at about the second temperature state, which is different than the first temperature state, the defined volume of the second fluid being pressurized with one or more anoxic gases during the second predetermined conditioning time; transferring the defined volume of the second fluid from the second pre-conditioning chamber to a second autoclave chamber in fluid communication with the second pre-conditioning chamber, the second autoclave chamber containing one or more metal test coupons therein; maintaining the defined volume of the second fluid in the second autoclave chamber at about the second temperature state or a third temperature state under anoxic conditions for a second predetermined testing time, the defined volume of the second fluid being pressurized with one or more anoxic gases and agitated with an impeller in the second autoclave chamber during the second predetermined testing time; and transferring the defined volume of the second fluid from the second autoclave chamber to one or more sampling receptacles in fluid communication with the second autoclave chamber, the one or more sampling receptacles maintaining the defined volume of the second fluid under anoxic conditions.

Element 44A: wherein the anoxic gas is sparged into the second pre-conditioning chamber.

Element 45A: wherein the method further comprises: analyzing for symptoms of corrosion within the metal test coupons by assaying the defined volume of the first fluid and the defined volume of the second fluid obtained from the one or more sampling receptacles.

Element 46A: wherein assaying the defined volume of the first fluid and the defined volume of the second fluid comprises performing an analysis for one or more metals.

Element 47A: wherein assaying the defined volume of the first fluid and the defined volume of the second fluid comprises performing an analysis for one or more biomarkers characteristic of a corrosion-causing microorganism.

Element 48A: wherein the one or more biomarkers are selected from the group consisting of DNA, RNA, a protein, a metabolite, and any combination thereof.

Element 49A: wherein the method further comprises: delivering one or more chemicals into the second fluid stream.

Element 50A: wherein the one or more chemicals include one or more members selected from the group consisting of a corrosion inhibitor, a scale inhibitor, a drag reducing agent, a hydrate inhibitor, an oxygen scavenger, a sulfide scavenger, a de-emulsifier, an anti-foaming agent, a biocide, an acid, a base, a surfactant, and any combination thereof.

Element 51A: wherein the defined volume of the second fluid is under a shear condition while in the second autoclave chamber.

Element 52A: wherein a first section of the second autoclave chamber is exposed to the shear condition and a second section of the second autoclave chamber is isolated from the shear condition.

Element 53A: wherein the first section and the second section are separated by a screen, and the second section contains a particulate material retained behind the screen.

Element 54A: wherein the one or more metal test coupons are retained within the second section behind the screen and below a bed of the particulate material.

Element 54A': wherein the screen and the particulate material are in housed in a cartridge that is positionable in a coupon insert within the second autoclave chamber.

Element 55A: wherein the method further comprises: actively cooling the second reservoir, or the first reservoir and the second reservoir.

Element 56A: wherein the first fluid and the second fluid each comprise a carrier fluid that is obtained from a common compositional source.

Element 57A: wherein the first fluid contains at least one type of microorganism and the second fluid is sterilized, the second fluid optionally containing at least one of a biocide, thimerosal, and an antibiotic substance.

Element 58A: wherein the method further comprises: measuring at least one test parameter of the first fluid and the second fluid; quantifying a difference in a measured value of the at least one test parameter between the first fluid and the second fluid; and determining an underlying source of corrosion within the one or more metal test coupons, the difference in the measured value of the at least one test parameter correlating to the underlying source of corrosion.

Element 59A: wherein the method further comprises: determining a relative extent of microorganism-induced corrosion and acid-induced corrosion from the difference in the measured value.

Element 60A: wherein each operation of transferring and maintaining is performed multiple times with multiple defined volumes of the first fluid and the second fluid.

Element 61A: wherein the method further comprises: providing a third fluid in a third reservoir maintained at about the first temperature state under anoxic conditions, the third fluid differing in composition from the first fluid and the second fluid; transferring a third fluid stream comprising a defined volume of the third fluid from the third reservoir to a third pre-conditioning chamber in fluid communication with the third reservoir; maintaining the defined volume of the third fluid in the third pre-conditioning chamber under anoxic conditions for a third predetermined conditioning time at about the second temperature state, which is different than the first temperature state, the defined volume of the third fluid being pressurized with one or more anoxic gases during the third predetermined conditioning time; transferring the defined volume of the third fluid from the third pre-conditioning chamber to a third autoclave chamber in fluid communication with the third pre-conditioning chamber, the third autoclave chamber containing one or more metal test coupons therein; maintaining the defined volume of the third fluid in the third autoclave chamber at about the second temperature state or a third temperature state under anoxic conditions for a third predetermined testing time, the defined volume of the third fluid being pressurized with one or more anoxic gases and agitated with an impeller in the third autoclave chamber during the third predetermined testing time; and transferring the defined volume of the third fluid from the third autoclave chamber to one or more sampling receptacles in fluid communication with the third autoclave chamber, the one or more sampling receptacles maintaining the defined volume of the third fluid under anoxic conditions.

Element 62A: wherein the anoxic gas is sparged into the third pre-conditioning chamber.

Element 63A: wherein the method further comprises: analyzing for symptoms of corrosion within the metal test coupons by assaying the defined volume of the first fluid, the defined volume of the second fluid, and the defined volume of the third fluid obtained from the one or more sampling receptacles.

Element 64A: wherein assaying the defined volume of the first fluid, the defined volume of the second fluid, and the defined volume of the third fluid comprises performing an analysis for one or more metals.

Element 65A: wherein assaying the defined volume of the first fluid, the defined volume of the second fluid, and the defined volume of the third fluid comprises performing an analysis for one or more biomarkers characteristic of a corrosion-causing microorganism.

Element 66A: wherein the one or more biomarkers are selected from the group consisting of DNA, RNA, a protein, a metabolite, and any combination thereof.

Element 67A: wherein the method further comprises: delivering one or more chemicals into the third fluid stream.

Element 68A: wherein the one or more chemicals include one or more members selected from the group consisting of a corrosion inhibitor, a scale inhibitor, a drag reducing agent, a hydrate inhibitor, an oxygen scavenger, a sulfide scavenger, a de-emulsifier, an anti-foaming agent, a biocide, an acid, a base, a surfactant, and any combination thereof.

Element 69A: wherein the defined volume of the third fluid is under a shear condition while in the third autoclave chamber.

Element 70A: wherein a first section of the third autoclave chamber is exposed to the shear condition and a second section of the third autoclave chamber is isolated from the shear condition.

Element 71A: wherein the first section and the second section are separated by a screen, and the second section contains a particulate material retained behind the screen.

Element 72A: wherein the one or more metal test coupons are retained within the second section behind the screen and below a bed of the particulate material.

Element 72A': wherein the screen and the particulate material are in housed in a cartridge that is positionable in a coupon insert within the third autoclave chamber.

Element 73A: wherein the method further comprises: actively cooling the third reservoir, or the first reservoir, the second reservoir, and the third reservoir.

Element 74A: wherein the first fluid, the second fluid and the third fluid each comprise a carrier fluid that is obtained from a common compositional source.

Element 75A: wherein the method further comprises: measuring at least one test parameter of the first fluid and the second fluid; quantifying a difference in a measured value of the at least one test parameter between the first fluid and the second fluid; and determining an underlying source of corrosion within the one or more metal test coupons, the difference in the measured value of the at least one test parameter correlating to the underlying source of corrosion.

Element 76A: wherein the method further comprises: determining a relative extent of microorganism-induced corrosion and acid-induced corrosion from the difference in the measured value.

Element 77A: wherein the method further comprises: analyzing for symptoms of corrosion within the metal test coupons by assaying at least one of the defined volume of the first fluid, the defined volume of the second fluid, and the defined volume of the third fluid obtained from the one or more sampling receptacles.

Element 78A: wherein assaying at least one of the defined volume of the first fluid, the defined volume of the second fluid, and the defined volume of the third fluid comprises performing an analysis for one or more metals.

Element 79A: wherein assaying at least one of the defined volume of the first fluid, the defined volume of the second fluid, and the defined volume of the third fluid comprises performing an analysis for one or more biomarkers characteristic of a corrosion-causing microorganism.

Element 80A: wherein the one or more biomarkers are selected from the group consisting of DNA, RNA, a protein, a metabolite, and any combination thereof.

Element 81A: wherein the first fluid contains at least one type of microorganism and the second fluid is sterilized, the second fluid optionally containing at least one of a biocide, thimerosal, and an antibiotic substance.

Element 82A: wherein the method further comprises: measuring at least one test parameter of the first fluid and the second fluid; quantifying a difference in a measured value of the at least one test parameter between the first fluid and the second fluid; and determining an underlying source of corrosion within the one or more metal test coupons, the difference in the measured value of the at least one test parameter correlating to the underlying source of corrosion.

Element 83A: wherein the method further comprises: determining a relative extent of microorganism-induced corrosion and acid-induced corrosion from the difference in the measured value.

Element 84A: wherein the method further comprises: measuring at least one second test parameter of the first fluid and the third fluid, the third fluid comprising an additive that is not present in the first fluid; quantifying a difference in a measured value of the at least one second test parameter between the first fluid and the third fluid; and determining an effect of the additive upon corrosion of the one or more metal test coupons, the difference in the measured value of the at least one second test parameter correlating to a magnitude of the effect upon corrosion.

Element 85A: wherein each operation of transferring and maintaining is performed multiple times with multiple defined volumes of the first fluid, the second fluid, and the third fluid.

Element 86A: wherein each operation of transferring and maintaining is performed in an automated fashion.

Exemplary combinations applicable to A include: The testing apparatus of A in combination with elements 1 and 2; 1 and 4; 1, 2 and 4; 1, 6 and 7; 1, 2, 6 and 7; 1 and 8; 1, 2 and 8; 1 and 11; 1, 2 and 11; 2 and 3; 2 and 4; 2, 3 and 4; 2, 6, and 7; 2 and 8; 2 and 11; 1A and 2A; 1A and 3A; 3A and 4A; 1A and 5A; 5A and 6A; 8A and 9A; 1A, 10A and 11A; 1A, 10A and 13A; 1A, 10A, 13A and 14A; 1A, 10A and 15A; 1A, 10A, 15A and 16A; 1A, 10A and 18A; 1A, 10A, 18A and 19A; 1A, 10A and 20A; 1A, 10A, 20A and 21A; 1A, 10A, 20A and 23A; 1A, 10A, 20A, 23A and 24A; 1A, 10A, 20A and 25A; 1A, 10A, 20A, 25A and 26A; 1A, 10A, 20A and 29A; and 1A, 10A, 20A, 28A and 29A.

Exemplary combinations applicable to B include: The testing method of B in combination with elements 18 and 19; 19 and 20; 19 and 21; 18 and 27; 18 and 29; 18, 29 and 30; 27 and 29; 27, 29 and 30; 18 and 33; 27 and 33; 18 and 34; 18 and 35; 27 and 33; 27 and 34; 27 and 35; 13, 18 and 19; 13, 19 and 20; 13, 19 and 21; 13, 18 and 27; 13, 18 and 29; 13, 18, 29 and 30; 13, 27 and 29; 13, 27, 29 and 30; 13, 18 and 33; 13, 27 and 33; 13, 18 and 34; 13, 18 and 35; 13, 27 and 33; 13, 27 and 34; 13, 27 and 35; 13, 15, 18 and 19; 13, 15, 19 and 20; 13, 15, 19 and 21; 13, 15, 18 and 27; 13, 15, 18 and 29; 13, 15, 18, 29 and 30; 13, 15, 27 and 29; 13, 15, 27, 29 and 30; 13, 15, 18 and 33; 13, 15, 27 and 33; 13, 15, 18 and 34; 13, 15, 18 and 35; 13, 15, 27 and 33; 13, 15, 27 and 34; 13, 15, 27 and 35; 31A and 32A; 31A and 33A; 31A and 35A; 31A and 37A; 31A and 41A; 35A and 41A; 37A and 41A; 31A and 42A; 35A and 42A; 37A and 41A; 31A, 32A and 43A; 31A, 33A and 43A; 31A, 35A and 43A; 31A, 37A and 43A; 31A, 41A and 43A; 35A, 41A and 43A; 37A, 41A and 43A; 31A, 42A and 43A; 35A, 42A and 43A; 37A, 42A and 43A; 41A, 42A and 43A; 43A and 44A; 43A and 45A; 43A, 44A and 45A; 43A, 45A and 46A; 43A, 45A and 47A; 43A and 49A; 47A and 51A; 43A, 44A and 51A; 43A and 56A; 43A and 57A; 43A, 57A and 58A; 43A, 57A, 58A and 59A; 43A and 60A; 31A, 32A, 43A and 61A; 31A, 33A, 43A and 61A; 31A, 35A, 43A and 61A; 31A, 37A, 43A and 61A; 31A, 41A, 43A and 61A; 35A, 41A, 43A and 61A; 37A, 41A, 43A and 61A; 31A, 42A, 43A and 61A; 35A, 42A, 43A and 61A; 37A, 42A, 43A and 61A; 41A, 42A, 43A and 61A; 43A, 61A and 62A; 43A, 61A and 63A; 43A, 61A 62A and 63A; 43A, 61A and 64A; 43A, 61A, 64A and 65A; 43A, 61A, 64A and 66A; 43A, 61A and 69A; 43A, 61A and 73A; 43A, 61A and 74A; 43A, 61A and 75A; 43A, 61A, 75A and 76A; 43A, 61A and 77A; 43A, 61A, 77A and 78A; 43A, 77A and 79A; 43A, 61A and 82A; 43A, 61A, 82A and 84A; and 43A, 61A and 85A.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

One or more illustrative embodiments are presented herein. Not all features of a physical implementation are described or shown in this application for the sake of clarity. It is understood that in the development of a physical embodiment of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for one of ordinary skill in the art and having benefit of this disclosure.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

What is claimed is:

1. A testing apparatus comprising:
    a first one-pass fluid train comprising:
        a first reservoir configured to maintain a first fluid at a first temperature state under anoxic conditions,
        a first pre-conditioning chamber in fluid communication with the first reservoir and configured to receive a first fluid stream comprising a defined volume of the first fluid from the first reservoir,
        a first autoclave chamber in fluid communication with the first pre-conditioning chamber and configured to receive the defined volume of the first fluid from the first pre-conditioning chamber, the first autoclave chamber having an impeller located therein, and
        one or more sampling receptacles in fluid communication with the first autoclave chamber and configured to receive the defined volume of the first fluid from the first autoclave chamber and to maintain the defined volume of the first fluid under anoxic conditions;
    wherein the first pre-conditioning chamber and the first autoclave chamber are configured to be maintained under anoxic conditions at a second temperature state different than the first temperature state, or the first pre-conditioning chamber and the first autoclave chamber are configured to be maintained under anoxic conditions at the second temperature state and a third temperature state, respectively, which are each different than the first temperature state.

2. The testing apparatus of claim 1, further comprising:
    at least one second one-pass fluid train separate from the first one-pass fluid train, the at least one second one-pass fluid train comprising:
        a second reservoir configured to maintain a second fluid at about the first temperature state under anoxic conditions,
        a second pre-conditioning chamber in fluid communication with the second reservoir and configured to receive a second fluid stream comprising a defined volume of the second fluid from the second reservoir,
        a second autoclave chamber in fluid communication with the second pre-conditioning chamber and configured to receive the defined volume of the second fluid from the second pre-conditioning chamber, the second autoclave chamber having an impeller located therein, and
        one or more sampling receptacles in fluid communication with the second autoclave chamber and configured to receive the defined volume of the second fluid from the second autoclave chamber and to maintain the defined volume of the second fluid under anoxic conditions;
    wherein the second pre-conditioning chamber and the second autoclave chamber are configured to be maintained under anoxic conditions at about the second temperature state, which is different than the first temperature state, or the second pre-conditioning chamber and the second autoclave chamber are configured to be maintained under anoxic conditions at about the second temperature state and a third temperature state, respectively, which are each different than the first temperature state.

3. The testing apparatus of claim 2, wherein the at least one second one-pass fluid train comprises two one-pass fluid trains that are separate from one another and from the first one-pass fluid train, the two one-pass fluid trains containing the second fluid and a third fluid, respectively.

4. The testing apparatus of claim 2, further comprising: one or more inlets configured to deliver one or more chemicals to at least one of the fluid streams.

5. The testing apparatus of claim 4, wherein the one or more chemicals include one or more members selected from the group consisting of a corrosion inhibitor, a scale inhibitor, a drag reducing agent, a hydrate inhibitor, an oxygen scavenger, a sulfide scavenger, a de-emulsifier, an emulsifier, a surfactant, an anti-foaming agent, a biocide, an acid, a base, and any combination thereof.

6. The testing apparatus of claim 2, wherein a gas sparging line is in fluid communication with at least one of the pre-conditioning chambers, and a gas sparger is housed in at least one of the pre-conditioning chambers, the gas sparger being in fluid communication with the gas sparging line.

7. The testing apparatus of claim 2, wherein at least one of the autoclave chambers comprises a first section and a second section that are separated from one another by a screen, the first section containing the impeller and the second section being configured to retain one or more metal test coupons within the second section behind the screen and below a bed of the particulate material.

8. The testing apparatus of claim 2, wherein at least one of the autoclave chambers is configured to retain one or more metal test coupons therein.

9. A testing method comprising:
providing a first fluid in a first reservoir maintained at a first temperature state under anoxic conditions;
transferring a first fluid stream comprising a defined volume of the first fluid from the first reservoir to a first pre-conditioning chamber in fluid communication with the first reservoir;
maintaining the defined volume of the first fluid in the first pre-conditioning chamber under anoxic conditions for a first predetermined conditioning time at a second temperature state different than the first temperature state, the defined volume of the first fluid being pressurized with one or more anoxic gases during the first predetermined conditioning time;
transferring the defined volume of the first fluid from the first pre-conditioning chamber to a first autoclave chamber in fluid communication with the first pre-conditioning chamber, the first autoclave chamber containing one or more metal test coupons therein;
maintaining the defined volume of the first fluid in the first autoclave chamber at about the second temperature state or a third temperature state under anoxic conditions for a first predetermined testing time, the defined volume of the first fluid being pressurized with one or more anoxic gases and agitated with an impeller in the first autoclave chamber during the first predetermined testing time; and
transferring the defined volume of the first fluid from the first autoclave chamber to one or more sampling receptacles in fluid communication with the first autoclave chamber, the one or more sampling receptacles maintaining the defined volume of the first fluid under anoxic conditions.

10. The testing method of claim 9, further comprising:
providing a second fluid in a second reservoir maintained at about the first temperature state under anoxic conditions, the second fluid differing in composition from the first fluid;
transferring a second fluid stream comprising a defined volume of the second fluid from the second reservoir to a second pre-conditioning chamber in fluid communication with the second reservoir;
maintaining the defined volume of the second fluid in the second pre-conditioning chamber under anoxic conditions for a second predetermined conditioning time at about the second temperature state, which is different than the first temperature state, the defined volume of the second fluid being pressurized with one or more anoxic gases during the second predetermined conditioning time;
transferring the defined volume of the second fluid from the second pre-conditioning chamber to a second autoclave chamber in fluid communication with the second pre-conditioning chamber, the second autoclave chamber containing one or more metal test coupons therein;
maintaining the defined volume of the second fluid in the second autoclave chamber at about the second temperature state or a third temperature state under anoxic conditions for a second predetermined testing time, the defined volume of the second fluid being pressurized with one or more anoxic gases and agitated with an impeller in the second autoclave chamber during the second predetermined testing time; and
transferring the defined volume of the second fluid from the second autoclave chamber to one or more sampling receptacles in fluid communication with the second autoclave chamber, the one or more sampling receptacles maintaining the defined volume of the second fluid under anoxic conditions.

11. The testing method of claim 10, wherein the first predetermined conditioning time and the second predetermined conditioning time are about the same, and the first predetermined testing time and the second predetermined testing time are about the same.

12. The testing method of claim 10, further comprising:
providing a third fluid in a third reservoir maintained at about the first temperature state under anoxic conditions, the third fluid differing in composition from the first fluid and the second fluid;
transferring a third fluid stream comprising a defined volume of the third fluid from the third reservoir to a third pre-conditioning chamber in fluid communication with the third reservoir;
maintaining the defined volume of the third fluid in the third pre-conditioning chamber under anoxic conditions for a third predetermined conditioning time at about the second temperature state, which is different than the first temperature state, the defined volume of the third fluid being pressurized with one or more anoxic gases during the third predetermined conditioning time;
transferring the defined volume of the third fluid from the third pre-conditioning chamber to a third autoclave chamber in fluid communication with the third pre-conditioning chamber, the third autoclave chamber containing one or more metal test coupons therein;

maintaining the defined volume of the third fluid in the third autoclave chamber at about the second temperature state or a third temperature state under anoxic conditions for a third predetermined testing time, the defined volume of the third fluid being pressurized with one or more anoxic gases and agitated with an impeller in the third autoclave chamber during the third predetermined testing time; and transferring the defined volume of the third fluid from the third autoclave chamber to one or more sampling receptacles in fluid communication with the third autoclave chamber, the one or more sampling receptacles maintaining the defined volume of the third fluid under anoxic conditions.

13. The testing method of claim 12, wherein the first predetermined conditioning time, the second predetermined conditioning time, and the third predetermined conditioning time are about the same, and the first predetermined testing time, the second predetermined testing time, and the third predetermined testing time are about the same.

14. The testing method of claim 12, further comprising:
measuring at least one second test parameter of the first fluid and the third fluid, the third fluid comprising an additive that is not present in the first fluid;
quantifying a difference in a measured value of the at least one second test parameter between the first fluid and the third fluid; and
determining an effect of the additive upon corrosion within the one or more metal test coupons, the difference in the measured value of the at least one second test parameter correlating to a magnitude of the effect upon corrosion.

15. The testing method of claim 10, wherein each fluid comprises a carrier fluid that is obtained from a common compositional source.

16. The testing method of claim 10, wherein the anoxic gas is sparged into each pre-conditioning chamber.

17. The testing method of claim 10, further comprising:
analyzing for symptoms of corrosion within the metal test coupons by assaying the defined volumes of at least one of the fluids obtained from the one or more sampling receptacles.

18. The testing method of claim 17, wherein assaying the defined volumes of at least one of the fluids comprises performing an analysis for one or more metals.

19. The testing method of claim 17, wherein assaying the defined volumes of at least one of the fluids comprises performing an analysis for one or more biomarkers characteristic of a corrosion-causing microorganism, wherein the one or more biomarkers are selected from the group consisting of DNA, RNA, a protein, a metabolite, and any combination thereof.

20. The testing method of claim 19, wherein the first fluid contains at least one type of microorganism and the second fluid is sterilized, the second fluid optionally containing at least one of a biocide, thimerosal, and an antibiotic substance.

21. The testing method of claim 10, further comprising:
measuring at least one test parameter of the first fluid and the second fluid;
quantifying a difference in a measured value of the at least one test parameter between the first fluid and the second fluid; and
determining an underlying source of corrosion within the one or more metal test coupons, the difference in the measured value of the at least one test parameter correlating to the underlying source of corrosion.

22. The testing method of claim 21, further comprising:
determining a relative extent of microorganism-induced corrosion and acid-induced corrosion from the difference in the measured value.

23. The testing method of claim 10, further comprising:
delivering one or more chemicals into at least one of the fluid streams, wherein the one or more chemicals include one or more members selected from the group consisting of a corrosion inhibitor, a scale inhibitor, a drag reducing agent, a hydrate inhibitor, an oxygen scavenger, a sulfide scavenger, a de-emulsifier, an emulsifier, a surfactant, an anti-foaming agent, a biocide, an acid, a base, and any combination thereof.

24. The testing method of claim 10, wherein a first section of each autoclave chamber is exposed to the shear condition and a second section of each autoclave chamber is isolated from the shear condition.

25. The testing method of claim 24, wherein the first section and the second section of each autoclave chamber are separated by a screen, and the second section of each autoclave chamber contains a bed of particulate material retained behind the screen, and at least a portion of the one or more metal test coupons in each autoclave chamber are retained within the second section behind the screen and below the bed of the particulate material.

26. The testing method of claim 25, wherein the screen and the particulate material are in housed in a cartridge that is positionable in a coupon insert within the autoclave chamber.

27. The testing method of claim 10, further comprising:
actively cooling each reservoir.

28. The testing method of claim 10, wherein each operation of transferring and maintaining is performed multiple times with multiple defined volumes of each fluid.

29. The testing method of claim 10, wherein each pre-conditioning chamber and each autoclave chamber are maintained at about the second temperature state.

30. The testing method of claim 10, wherein each operation of transferring and maintaining is performed in an automated fashion.

* * * * *